US012744852B2

(12) United States Patent
Yada

(10) Patent No.: US 12,744,852 B2
(45) Date of Patent: Sep. 22, 2026

(54) COMPUTER-READABLE STORAGE MEDIUM, MANAGEMENT DEVICE, AND MANAGEMENT SYSTEM FOR MANAGING DEVICES

(71) Applicant: BROTHER KOGYO KABUSHIKI KAISHA, Nagoya (JP)

(72) Inventor: Yuki Yada, Kuwana (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 6 days.

(21) Appl. No.: 18/416,136

(22) Filed: Jan. 18, 2024

(65) Prior Publication Data

US 2024/0333843 A1 Oct. 3, 2024

(30) Foreign Application Priority Data

Mar. 31, 2023 (JP) ................................ 2023-057726

(51) Int. Cl.
*H04N 1/00* (2006.01)
*G06F 3/12* (2006.01)

(52) U.S. Cl.
CPC ..... *H04N 1/00068* (2013.01); *H04N 1/00034* (2013.01); *H04N 1/00344* (2013.01)

(58) Field of Classification Search
None
See application file for complete search history.

(56) References Cited

U.S. PATENT DOCUMENTS

2005/0071495 A1 3/2005 Kadota
2013/0275578 A1* 10/2013 Williams .............. H04L 47/822 709/224
2016/0379196 A1* 12/2016 Kawamori ........... G06Q 20/202 705/21
2022/0398181 A1* 12/2022 Fang .................... G08B 21/182
2023/0292965 A1* 9/2023 Wasada ..................... E03D 1/00 4/661

FOREIGN PATENT DOCUMENTS

CN 110376429 * 10/2019 ............. G01R 21/00
JP H08241179 A 9/1996

(Continued)

*Primary Examiner* — Beniyam Menberu
(74) *Attorney, Agent, or Firm* — Scully, Scott, Murphy & Presser, P.C.

(57) ABSTRACT

A non-transitory computer-readable storage medium stores computer-readable instructions executable by a processor of a management device to manage a plurality of devices. The instructions are configured to, when executed by the processor, cause the management device to classify each of the plurality of devices into one of a plurality of groups, obtain usage information from each of the plurality of devices, calculate a reference value of a usage-related value in the usage information for one or more devices belonging to each of the plurality of groups, extract one or more abnormally-used devices each of which has an abnormal usage-related value from the one or more devices belonging to each of the plurality of groups, based on the reference value, and provide a notification of device-specific information for identifying the one or more abnormally-used devices extracted from the one or more devices belonging to each of the plurality of groups.

16 Claims, 13 Drawing Sheets

(56) References Cited

FOREIGN PATENT DOCUMENTS

| | | | | |
|---|---|---|---|---|
| JP | 2003330695 A | | 11/2003 | |
| JP | 2004360925 | * | 12/2004 | .............. F24F 11/02 |
| JP | 2005196573 A | | 7/2005 | |
| JP | 2008301476 | * | 12/2008 | ............... H04N 1/00 |
| JP | 2010010825 | * | 1/2010 | .............. B41J 29/38 |
| JP | 2012068458 | * | 4/2012 | .............. B41J 29/46 |
| JP | 2013122510 A | | 6/2013 | |
| JP | 2016014985 | * | 1/2016 | .............. B41J 29/38 |
| JP | 2017016178 | * | 1/2017 | ............. G06F 13/00 |
| JP | 2019081178 | * | 5/2019 | ............. B23K 11/24 |

* cited by examiner

COMPUTER-READABLE STORAGE MEDIUM, MANAGEMENT DEVICE, AND MANAGEMENT SYSTEM FOR MANAGING DEVICES

REFERENCE TO RELATED APPLICATIONS

This application claims priority from Japanese Patent Application No. 2023-057726 filed on Mar. 31, 2023. The entire content of the priority application is incorporated herein by reference.

BACKGROUND ART

A printing system has been known that is configured to identify a printer with the smallest number of items (e.g., documents) to be printed among a plurality of printers and assign print data to the identified printer.

SUMMARY

The identified printer with the smallest number of items to be printed may have an anomaly.

Aspects of the present disclosure are advantageous for providing one or more improved techniques that make it possible to extract one or more abnormally-used devices, thereby causing an administrator to take appropriate measures for the extracted one or more abnormally-used devices.

According to aspects of the present disclosure, a non-transitory computer-readable storage medium is provided, which stores computer-readable instructions that are executable by a processor of a management device configured to manage a plurality of devices. The instructions are configured to, when executed by the processor, cause the management device to classify each of the plurality of devices into one of a plurality of groups. The instructions are further configured to, when executed by the processor, cause the management device to obtain usage information from each of the plurality of devices, the usage information including a usage-related value representing how much each of the plurality of devices has been used. The instructions are further configured to, when executed by the processor, cause the management device to calculate a reference value of the usage-related value for one or more devices belonging to each of the plurality of groups. The instructions are further configured to, when executed by the processor, cause the management device to extract one or more abnormally-used devices each of which has an abnormal usage-related value from the one or more devices belonging to each of the plurality of groups, based on the calculated reference value. The instructions are further configured to, when executed by the processor, cause the management device to provide a notification of device-specific information for identifying the one or more abnormally-used devices extracted from the one or more devices belonging to each of the plurality of groups.

According to aspects of the present disclosure, further provided is a management device that includes a communication interface and a controller. The communication interface is configured to communicate with a plurality of devices. The controller is configured to classify each of the plurality of devices into one of a plurality of groups. The communication interface is further configured to obtain usage information from each of the plurality of devices via the communication interface, the usage information including a usage-related value representing how much each of the plurality of devices has been used. The communication interface is further configured to calculate a reference value of the usage-related value for one or more devices belonging to each of the plurality of groups. The communication interface is further configured to extract one or more abnormally-used devices each of which has an abnormal usage-related value from the one or more devices belonging to each of the plurality of groups, based on the calculated reference value. The communication interface is further configured to provide a notification of device-specific information for identifying the one or more abnormally-used devices extracted from the one or more devices belonging to each of the plurality of groups.

According to aspects of the present disclosure, further provided is a management system that includes a plurality of devices and a management device. The management device includes a communication interface and a controller. The communication interface is configured to communicate with the plurality of devices. The controller is configured to classify each of the plurality of devices into one of a plurality of groups. The controller is further configured to obtain usage information from each of the plurality of devices via the communication interface, the usage information including a usage-related value representing how much each of the plurality of devices has been used. The controller is further configured to calculate a reference value of the usage-related value for one or more devices belonging to each of the plurality of groups. The controller is further configured to extract one or more abnormally-used devices each of which has an abnormal usage-related value from the one or more devices belonging to each of the plurality of groups, based on the calculated reference value. The controller is further configured to provide a notification of device-specific information for identifying the one or more abnormally-used devices extracted from the one or more devices belonging to each of the plurality of groups.

DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

1. First Illustrative Embodiment

A first illustrative embodiment according to aspects of the present disclosure will be described below with reference to the accompanying drawings.

1-1. Configuration of Management System

Figure 1:
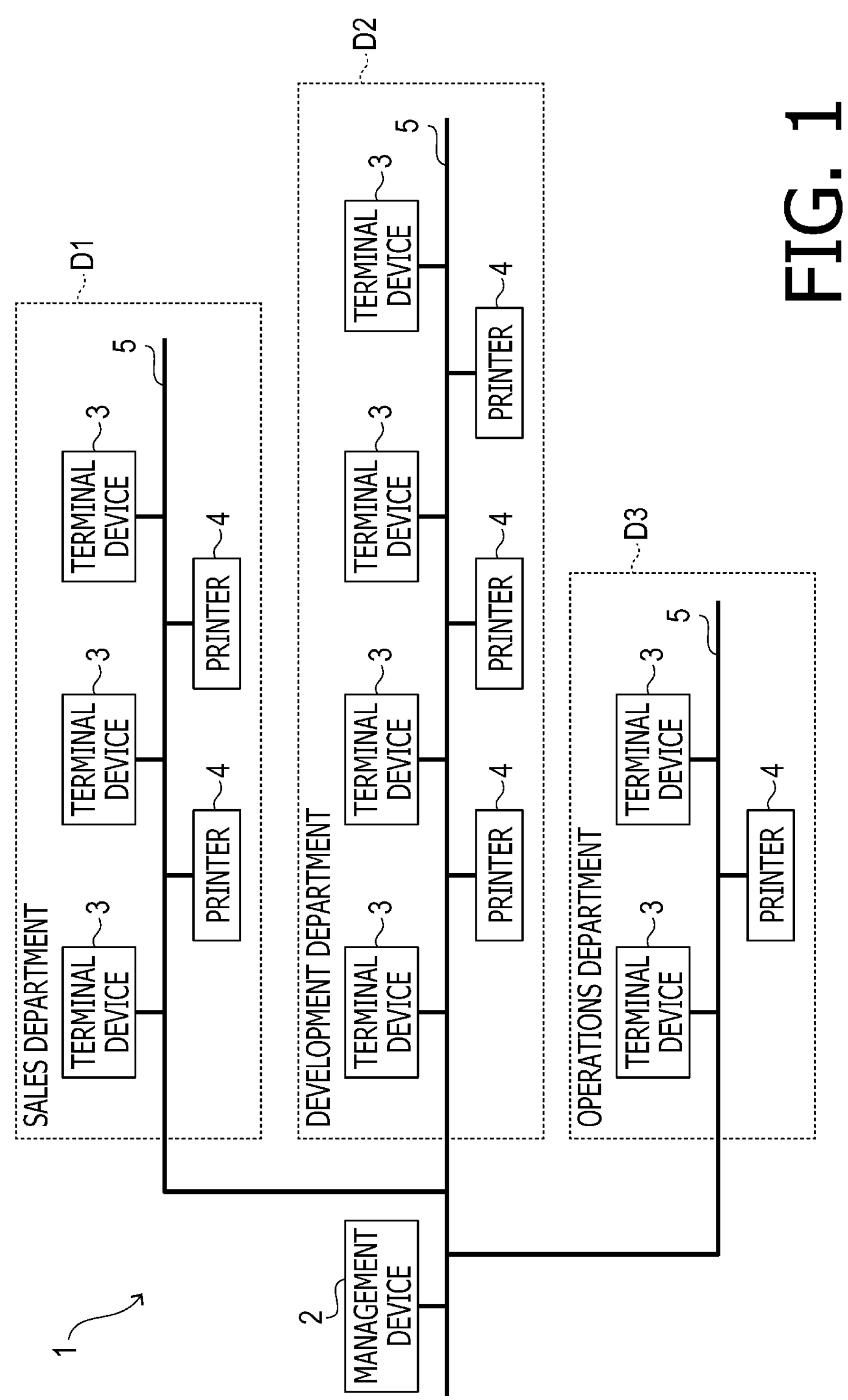
FIG. 1 schematically shows a configuration of a management system.

A management system 1 of the first illustrative embodiment is configured to manage a plurality of printers 4 used in a company with a plurality of departments. As shown in FIG. 1, the management system 1 includes a management device 2, a plurality of terminal devices 3, and the plurality of printers 4. The management device 2, the terminal devices 3, and the printers 4 are configured to communicate with each other via a LAN ("LAN" is an abbreviation for "Local Area Network") 5 as an example of a network. Practicable examples of the network are not limited to LAN but may include WAN ("WAN" is an abbreviation for "Wide Area Network") and a network including both LAN and WAN. In the first illustrative embodiment, each terminal device 3 and each printer 4 belong to one of a sales department D1, a development department D2, and an operations department D3.

Figure 2:
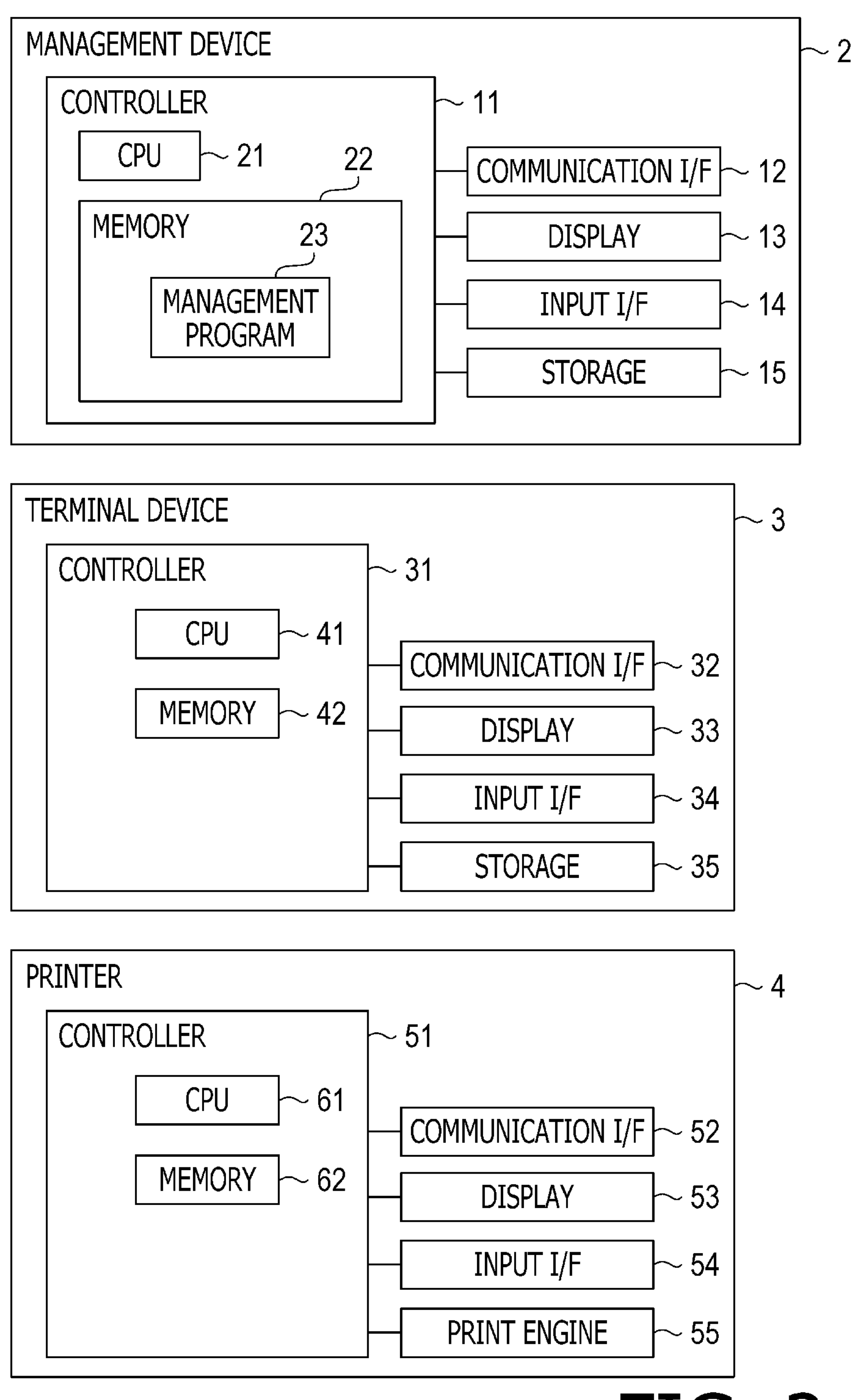
FIG. 2 is a block diagram schematically showing configurations of a management device, a terminal device, and a printer.

The management device 2 is a personal computer in the first illustrative embodiment. As shown in FIG. 2, the management device 2 includes a controller 11, a communication I/F ("I/F" is an abbreviation for "interface") 12, a display 13, an input I/F 14, and a storage 15. The controller 11 includes a CPU 21 and a memory 22. The CPU 21 is configured to execute programs stored in the memory 22, thereby achieving various functions of the management device 2. The various functions realized by the controller 11 may not necessarily be achieved by the CPU 21 executing the programs, but at least one of the functions may be achieved using one or more hardware elements.

The memory 22 includes semiconductor memories (e.g., a ROM, a RAM and a flash memory). The memory 22 is configured to store a management program 23 and data. The communication I/F 12 is configured to perform data communication with the terminal devices 3 and the printers 4 via the LAN 5.

The display 13 is configured to display various images thereon. The input I/F 14 includes a keyboard (not shown) and a mouse (not shown). The input I/F 14 is configured to output input operation information for identifying input operations performed by a user (e.g., an administrator) of the management device 2, for instance, via the keyboard and/or the mouse.

The storage 15 includes auxiliary storage devices such as an HDD ("HDD" is an abbreviation for "Hard Disk Drive") and an SSD ("SSD" is an abbreviation for "Solid State Drive"). The storage 15 is configured to store various types of data.

In the first illustrative embodiment, the terminal devices 3 are personal computers. Each terminal device 3 includes a controller 31, a communication I/F 32, a display 33, an input I/F 34, and a storage 35. The terminal devices 3 may be portable terminals such as smartphones or tablet computers.

The controller 31 includes a CPU 41 and a memory 42. The CPU 41 is configured to execute programs stored in the memory 42, thereby achieving various functions of the terminal device 3. The various functions realized by the controller 31 may not necessarily be achieved by the CPU 41 executing the programs, but at least one of the functions may be achieved using one or more hardware elements.

The memory 42 includes semiconductor memories (e.g., a ROM, a RAM, and a flash memory). The memory 42 is configured to store programs and data. The communication I/F 32 is configured to perform data communication with the management device 2 and the printers 4 via the LAN 5.

The display 33 is configured to display various images thereon. The input I/F 34 includes a keyboard (not shown) and a mouse (not shown). The input I/F 34 is configured to output input operation information for identifying input operations performed by a user of the corresponding terminal device 3, for instance, via the keyboard and/or the mouse.

The storage 35 includes auxiliary storage devices such as an HDD and an SSD. The storage 35 is configured to store various types of data. Each printer 4 includes a controller 51, a communication I/F 52, a display 53, an input I/F 54, and a print engine 55.

The controller 51 includes a CPU 61 and a memory 62. The CPU 61 is configured to execute programs stored in the memory 62, thereby achieving various functions of the printer 4. The various functions realized by the controller 51 may not necessarily be achieved by the CPU 61 executing the programs, but at least one of the functions may be achieved using one or more hardware elements. The memory 62 includes semiconductor memories (e.g., a ROM, a RAM, and a flash memory). The memory 62 is configured to store programs and data.

The communication I/F 52 is configured to perform data communication with the management device 2 and the terminal devices 3 via the LAN 5. The display 53 is configured to display various images thereon. The input I/F 54 includes a touch panel (not shown) laid on a display screen of the display 53 and switches (not shown) disposed around the display screen of the display 53. The input I/F 54 is configured to output input operation information for identifying input operations performed by a user of the corresponding printer 4, for instance, via the touch panel and/or the switches.

The print engine 55 is configured to print an image on a print medium using an inkjet technology or an electrophotographic technology. The print engine 55 may be configured to print an image on a print medium using a thermal technology. In the first illustrative embodiment, each printer 4 with the print engine 55 configured to perform inkjet printing will be referred to as an "inkjet printer." Each printer 4 with the print engine 55 configured to perform electrophotographic printing will be referred to as a "laser printer."

The controller 51 measures a time (hereinafter referred to as a "usage time") for which the corresponding printer 4 has been used during a predetermined determination period (e.g., one week) to date (i.e., from the determination period ago until the present time), and stores usage time information indicating the measured usage time in the memory 62.

The controller 51 measures the number of times (hereinafter referred to as the "number of power-on times") the corresponding printer 4 has been switched from a power-off state to a power-on state during the determination period to date, and stores power-on-times information indicating the measured number of power-on times in the memory 62.

The controller 51 measures the number of times (hereinafter referred to as the "number of return-from-sleep times") the corresponding printer 4 has been brought back to a normal mode from a sleep mode during the determination period to date, and stores return-from-sleep-times information indicating the measured number of return-from-sleep times in the memory 62. The sleep mode is an operating mode for reducing power consumption in an unused state where the printer 4 is not used by stopping some (e.g., at least one but not all) of available functions of the printer 4. The normal mode is a normally-operating mode in which all pre-assigned functions of the printer 4 are executable.

The controller 51 stores in the memory 62 consumables replacement date information indicating a most recent date (hereinafter referred to as a "consumables replacement date") when a consumable item for the corresponding printer 4 was replaced. The controller 51 measures the number of times (hereinafter referred to as the "number of cover-opened times") covers (e.g., a top cover, a front cover, and a rear cover) included in a housing of the printer 4 have been opened during the determination period to date, and stores cover-opened-times information indicating the measured number of cover-opened times in the memory 62.

The controller 51 measures the number of times (hereinafter referred to as the "number of sheet-tray-opened times") sheet trays of the corresponding printer 4 have been opened during the determination period to date, and stores sheet-tray-opened-times information indicating the measured number of sheet-tray-opened times in the memory 62. The controller 51 measures a quantity (hereinafter referred to as the "remaining sheet quantity") of sheet(s) remaining in the printer 4 at the present time, and stores remaining-sheet-quantity information indicating the measured remaining sheet quantity in the memory 62.

1-2. Printer Management Window

The management device 2 is configured to display a printer management window W1 (see FIG. 3) on a display screen of the display 13. After the management program 23 is launched, the printer management window W1 is displayed in response to a particular input operation for displaying the printer management window W1 being performed via the keyboard or the mouse.

Figure 3:
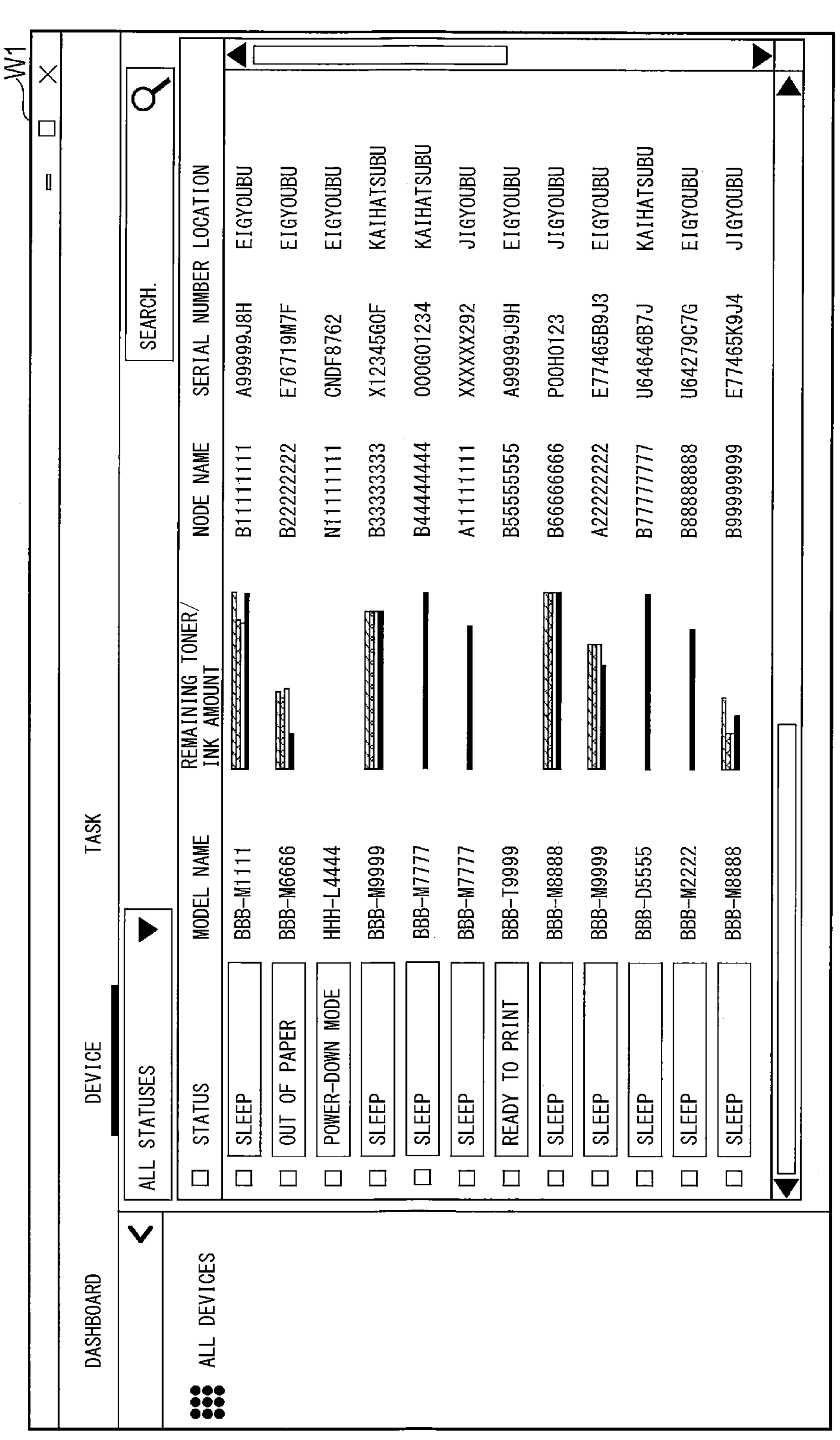
FIG. 3 shows an example of a printer management window.

As shown in FIG. 3, the printer management window W1 is configured to display at least a status, a model name, a remaining toner/ink amount, a node name, a device serial number, and a location for each of the plurality of printers 4 included in the management system 1.

The status is a current status of the corresponding printer 4. The model name is a name of a model of the corresponding printer 4. The remaining toner/ink amount is an amount of toner or ink remaining in the corresponding printer 4. The node name is a character string set for identifying the corresponding printer 4. The device serial number is a specific number set for identifying the corresponding printer 4. The location is a character string indicating a department to which the corresponding printer 4 belongs.

The status, the model name, the remaining toner/ink amount, the node name, the device serial number, and the location described above are displayed in the printer management window W1, respectively, based on status information, remaining toner/ink amount information, node name information, serial number information, and location information being obtained by the management device 2 from each printer 4.

1-3. Device Notification Setting Window

The management device 2 is further configured to display a device notification setting window W2 (see FIG. 4) on the display screen of the display 13. After the management program 23 is launched, the device notification setting window W2 is displayed in response to a particular input operation for displaying the device notification setting window W2 being performed via the keyboard or the mouse.

Figure 4:
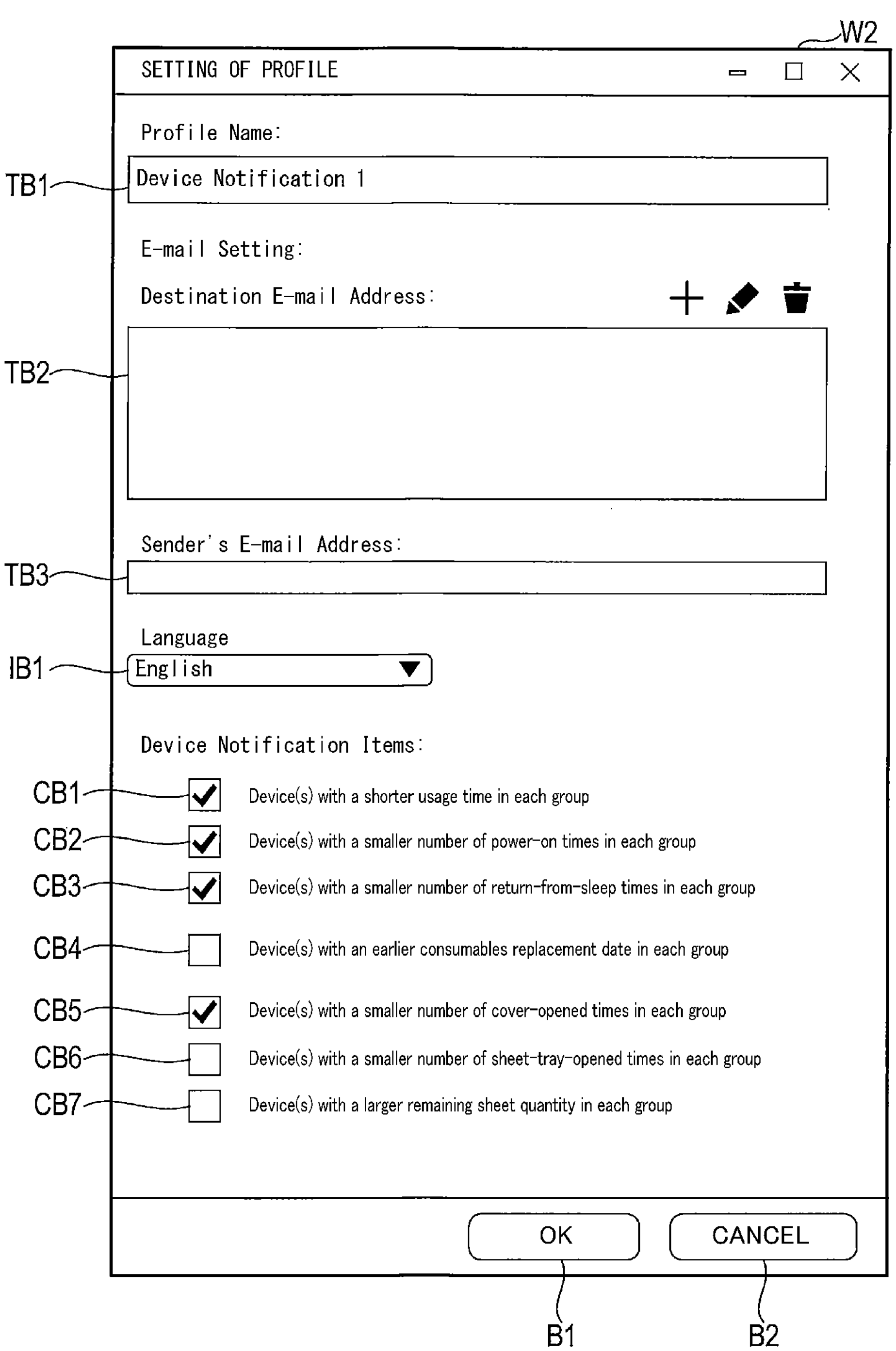
FIG. 4 shows an example of a device notification setting window.

The device notification setting window W2 is a window for setting a profile containing data necessary to provide a device notification. As shown in FIG. 4, the device notification setting window W2 includes input text boxes TB1, TB2, and TB3, a used language input button IB1, check boxes CB1, CB2, CB3, CB4, CB5, CB6, and CB7, an OK button B1, and a cancel button B2.

In the input text box TB1, a character string is entered to identify the profile set in the device notification setting window W2. In the input text box TB2, a character string indicating a destination e-mail address is entered. In the input text box TB3, a character string indicating a sender's e-mail address is entered.

The used language input button IB1 is a pull-down button configured to, when clicked with the mouse, display a plurality of available language choices. The administrator may click one of the displayed available language choices with the mouse, thereby setting a used language.

Each of the checkboxes CB1 to CB7 is configured to, when clicked with the mouse, be switched between a checked state and an unchecked state. The checked state is a state where a check mark is placed in each of the checkboxes CB1 to CB7. The unchecked state is a state where no check mark is placed in each of the checkboxes CB1 to CB7.

The check box CB1 is set to the checked state when the administrator wishes to provide a notification of one or more printers 4 with a relatively shorter usage time (i.e., one or more printers 4 each of which has been used for a relatively shorter period of time) among the printers 4 in each group. The check box CB2 is set to the checked state when the administrator wishes to provide a notification of one or more printers 4 with a relatively smaller number of power-on times (i.e., one or more printers 4 each of which has been switched from the power-off state to the power-on state a relatively smaller number of times) among the printers 4 in each group.

The check box CB3 is set to the checked state when the administrator wishes to provide a notification of one or more printers 4 with a relatively smaller number of return-from-sleep times (i.e., one or more printers 4 each of which has been brought back to the normal mode from the sleep mode a relatively smaller number of times) among the printers 4 in each group. The check box CB4 is set to the checked state when the administrator wishes to provide a notification of one or more printers 4 with a relatively earlier consumables replacement date (i.e., one or more printers 4 of which the most recent date when a consumable item was replaced is relatively earlier) among the printers 4 in each group.

The check box CB5 is set to the checked state when the administrator wishes to provide a notification of one or more printers 4 with a relatively smaller number of cover-opened times (i.e., one or more printers 4 of which the covers have been opened a relatively smaller number of times) among the printers 4 in each group. The check box CB6 is set to the checked state when the administrator wishes to provide a notification of one or more printers 4 with a relatively smaller number of sheet-tray-opened times (i.e., one or more printers 4 of which the sheet trays have been opened a relatively smaller number of times) among the printers 4 in each group.

The check box CB7 is set to the checked state when the administrator wishes to provide a notification of one or more printers 4 with a relatively larger remaining sheet quantity (i.e., one or more printers 4 each of which has a relatively larger quantity of sheets remaining therein) among the printers 4 in each group. The OK button B1 is a button to be operated to complete the setting of the profile with the contents entered in the input text boxes TB1, TB2, and TB3 and the contents set for the used language input button IB1 and the check boxes CB1 to CB7. The cancel button B2 is a button to be operated to interrupt the setting of the profile.

1-4. Process by Management Device

Next, a procedure of a printer management process to be performed by the controller 11 of the management device 2 will be described with reference to FIGS. 5 to 7. The printer management process is started in response to the management program 23 being launched by an administrator's input operation, and is then performed each time a predetermined execution period has elapsed.

Figure 5:
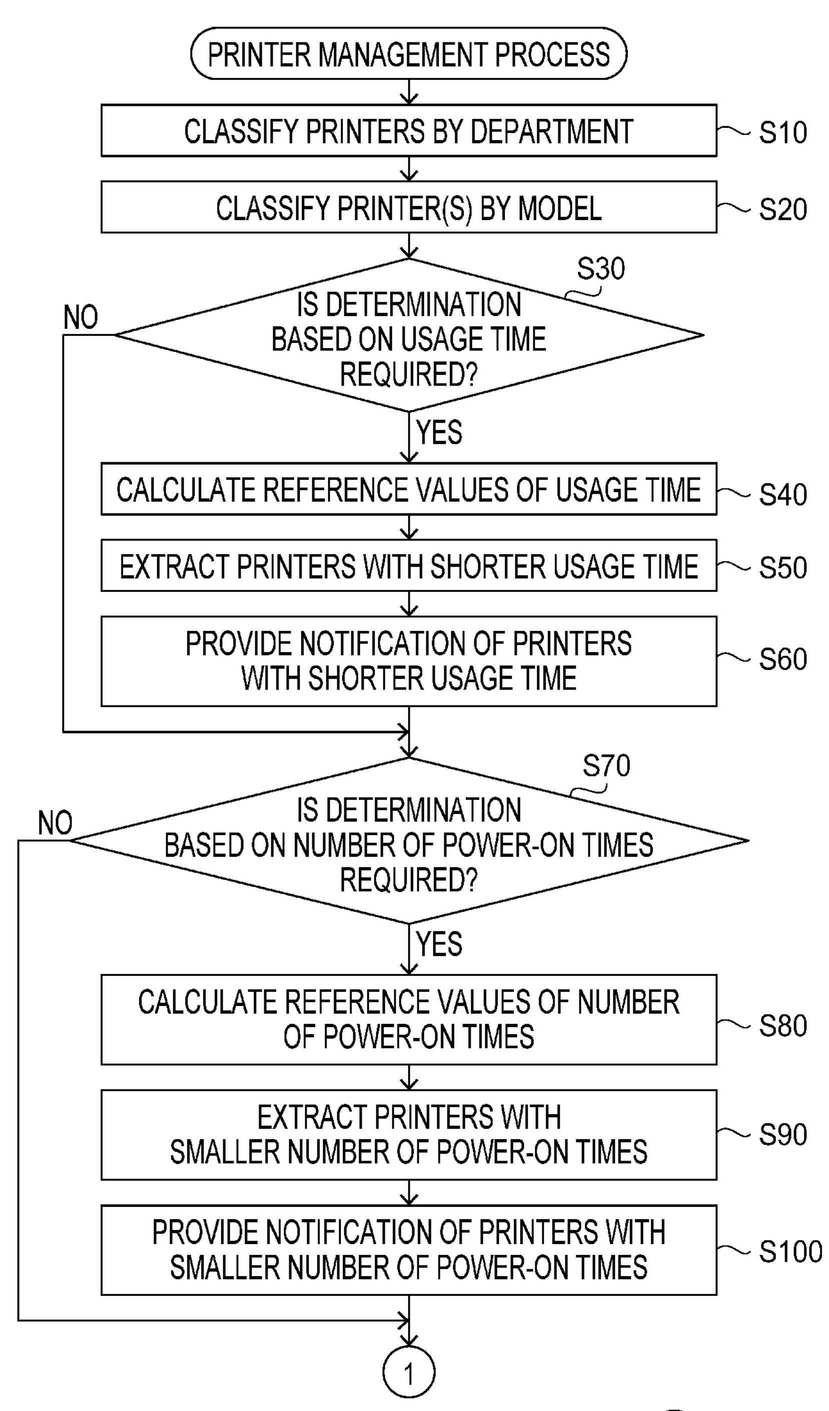
FIGS. 5 to 7 are flowcharts showing a procedure of a printer management process.

After starting the printer management process, as shown in FIG. 5, the CPU 21 of the controller 11 classifies the plurality of printers 4 included in the management system 1 by department in S10. Specifically, the CPU 21 classifies the plurality of printers 4 by department by identifying the department of each printer 4 based on the location information obtained from each printer 4. In the first illustrative embodiment, each of the plurality of printers 4 is classified into one of the three departments, i.e., the sales department D1, the development department D2, and the operations department D3.

In S20, the CPU 21 classifies one or more printers 4 belonging to each of the departments by model. Specifically, the CPU 21 classifies each of the one or more printers 4 belonging to each department into one of an inkjet printer group P1 and a laser printer group P2 by identifying whether each printer 4 is an inkjet printer or a laser printer based on the model name obtained from each printer 4.

Thus, in the first illustrative embodiment, each of the one or more printers 4 belonging to each of the three departments (i.e., the sales department D1, the development department D2, and the operations department D3) is classified into the inkjet printer group P1 or the laser printer group P2. The following processes are performed for each category classified by department and model. For instance, in the first illustrative embodiment, the following processes are performed for each of the categories classified by department and model, i.e., the inkjet printer group P1 in the sales department D1, the laser printer group P2 in the sales department D1, the inkjet printer group P1 in the development department D2, the laser printer group P2 in the development department D2, the inkjet printer group P1 in the operations department D3, and the laser printer group P2 in the operations department D3.

In S30, the CPU 21 determines whether a determination based on the usage time is required to be made. Specifically, the CPU 21 determines whether the check box CB1 in the device notification setting window W2 is set to the checked state. Namely, the CPU 21 determines that the determination based on the usage time is required to be made, when the check box CB1 is set to the checked state.

In response to determining that the determination based on the usage time is not required to be made (S30: No), the CPU 21 proceeds to S70. Meanwhile, in response to determining that the determination based on the usage time is required to be made (S30: Yes), the CPU 21 calculates reference values of the usage time in S40. Specifically, the CPU 21 first obtains the usage time information from each of the plurality of printers 4 included in the management system 1. Subsequently, based on the obtained usage time information, the CPU 21 calculates, for each of the departments, an average value $\mu 11$ and a standard deviation $\sigma 11$ of the usage time for the printers 4 belonging to the inkjet printer group P1, and an average value $\mu 12$ and a standard deviation $\sigma 12$ of the usage time for the printers 4 belonging to the laser printer group P2. Then, the CPU 21 calculates a reference value J11 of the usage time for the printers 4 belonging to the inkjet printer group P1 using the following formula (1). In addition, the CPU 21 calculates a reference value J12 of the usage time for the printers 4 belonging to the laser printer group P2 using the following formula (2).

$$J11 = (\mu 11 - 2 \times \sigma 11) \quad (1)$$

$$J12 = (\mu 12 - 2 \times \sigma 12) \quad (2)$$

In S50, for each of the departments, the CPU 21 extracts one or more printers 4 each of which has a usage time less than the reference value J11 from the inkjet printer group P1 as printer(s) 4 with a relatively shorter usage time, and also extracts one or more printers 4 each of which has a usage time less than the reference value J12 from the laser printer group P2 as printer(s) 4 with a relatively shorter usage time.

In S60, the CPU 21 provides a notification of the printers 4 extracted in S50 as printers 4 with a relatively shorter usage time. Thereafter, the CPU 21 proceeds to S70. Specifically, in S60, the CPU 21 displays, on the display screen of the display 13, device-specific information (in the first illustrative embodiment, for instance, the device serial numbers) for identifying the printers 4 extracted in S50, and a reason for the notification (i.e., a reason why the notification is provided is that each of the printers 4 extracted has a relatively shorter usage time).

Figure 8:
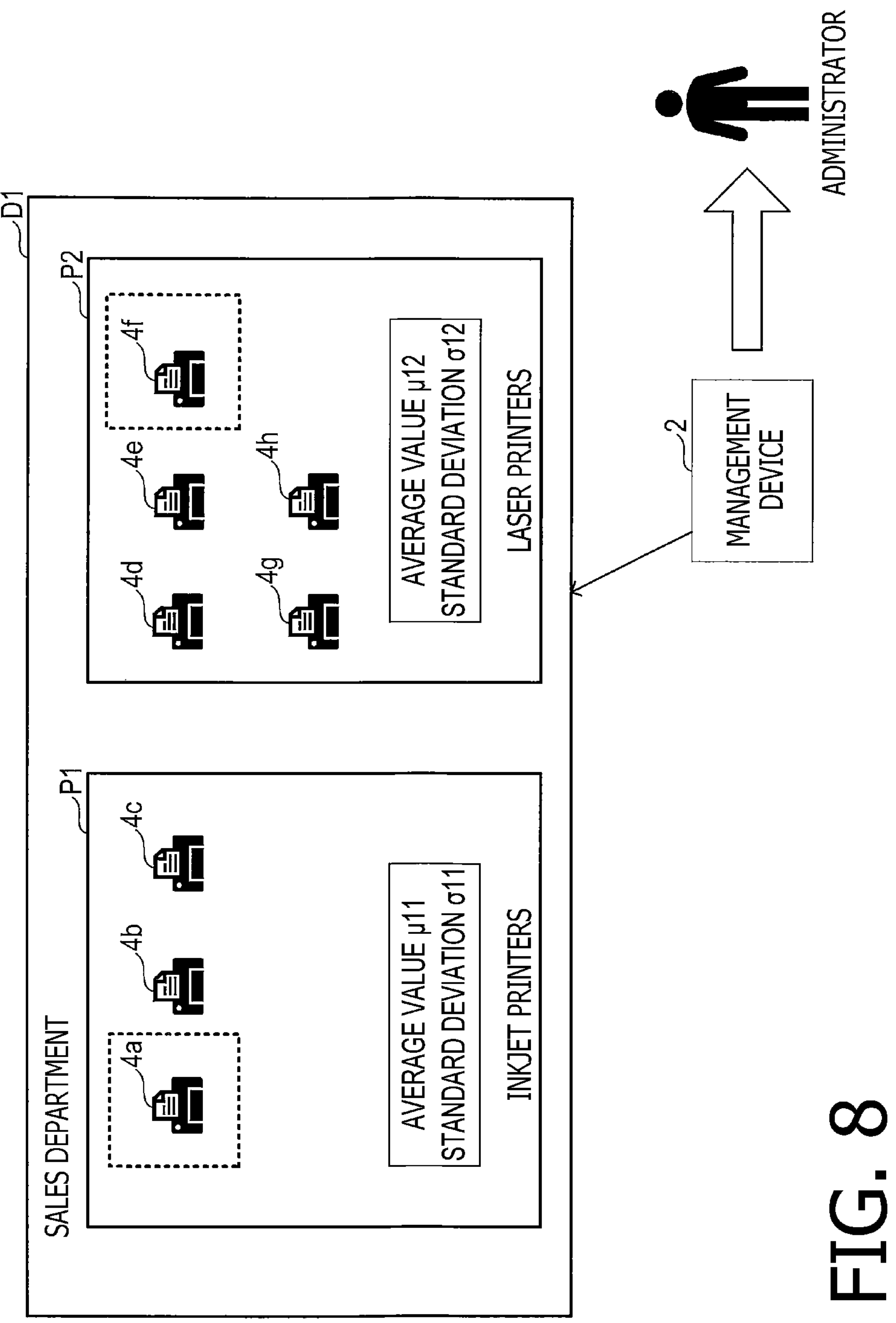
FIG. 8 is an illustration for explaining how to classify printers and how to extract one or more printers.

Suppose for instance that as shown in FIG. 8, printers 4*a*, 4*b*, 4*c*, 4*d*, 4*e*, 4*f*, 4*g*, and 4*h* are classified into the sales department D1. Further, suppose for instance that the printers 4*a*, 4*b*, and 4*c* are classified into the inkjet printer group P1 and that the printers 4*d*, 4*e*, 4*f*, 4*g*, and 4*h* are classified into the laser printer group P2.

In this case, the CPU 21 calculates the average value $\mu 11$ and the standard deviation $\sigma 11$ of the usage time, based on the usage times of the printers 4*a*, 4*b*, and 4*c* included in the inkjet printer group P1 of the sales department D1. The CPU 21 also calculates the average value $\mu 12$ and the standard deviation 612 of the usage time, based on the usage times of the printers 4*d*, 4*e*, 4*f*, 4*g*, and 4*h* included in the laser printer group P2 of the sales department D1.

Suppose for instance that among the printers 4*a*, 4*b*, and 4*c*, the usage time of the printer 4*a* is less than ($\mu 11 - 2 \times \sigma 11$), and the usage times of the printers 4*b* and 4*c* are equal to or more than ($\mu 11 - 2 \times \sigma 11$). In this case, the printer 4*a* is extracted as a printer 4 with a relatively shorter usage time from the inkjet printer group P1 of the sales department D1.

Suppose for instance that among the printers 4*d*, 4*e*, 4*f*, 4*g*, and 4*h*, the usage time of the printer 4*f* is less than ($\mu 12 - 2 \times \sigma 12$), and the usage times of the printers 4*d*, 4*e*, 4*g*, and 4*h* are equal to or more than ($\mu 12 - 2 \times \sigma 12$). In this case, the printer 4*f* is extracted as a printer 4 with a relatively shorter usage time from the laser printer group P2 of the sales department D1.

As shown in FIG. 5, after S60 or the negative determination in S30 (S30: No), the CPU 21 proceeds to S70 to determine whether a determination based on the number of power-on times is required to be made. Specifically, the CPU 21 determines whether the check box CB2 in the device notification setting window W2 is set to the checked state. Namely, the CPU 21 determines that the determination based on the number of power-on times is required to be made, when the check box CB2 is set to the checked state.

In response to determining that the determination based on the number of power-on times is not required to be made (S70: No), the CPU 21 proceeds to S110. Meanwhile, in response to determining that the determination based on the number of power-on times is required to be made (S70: Yes), the CPU 21 calculates reference values of the number of power-on times in S80. Specifically, the CPU 21 first obtains the power-on-times information from each of the plurality of printers 4 included in the management system 1. Subsequently, based on the obtained power-on-times information, the CPU 21 calculates, for each of the departments, an average value μ21 and a standard deviation 621 of the number of power-on times for the printers 4 belonging to the inkjet printer group P1, and an average value μ22 and a standard deviation σ22 of the number of power-on times for the printers belonging to the laser printer group P2. Then, the CPU 21 calculates a reference value J21 of the number of power-on times for the printers 4 belonging to the inkjet printer group P1 using the following formula (3). In addition, the CPU 21 calculates a reference value J22 of the number of power-on times for the printers 4 belonging to the laser printer group P2 using the following formula (4).

$$J21 = (\mu 21 - 2 \times \sigma 21) \quad (3)$$

$$J22 = (\mu 22 - 2 \times \sigma 22) \quad (4)$$

In S90, for each of the departments, the CPU 21 extracts one or more printers 4 each of which has the number of power-on times less than the reference value J21 from the inkjet printer group P1 as printer(s) 4 with a relatively smaller number of power-on times, and also extracts one or more printers 4 each of which has the number of power-on times less than the reference value J22 from the laser printer group P2 as printer(s) 4 with a relatively smaller number of power-on times.

In S100, the CPU 21 provides a notification of the printers 4 extracted in S90 as printers 4 with a relatively smaller number of power-on times. Thereafter, the CPU 21 proceeds to S110. Specifically, in S100, the CPU 21 displays, on the display screen of the display 13, the device-specific information for identifying the printers 4 extracted in S90, and a reason for the notification (i.e., a reason why the notification is provided is that each of the printers 4 extracted has a relatively smaller number of power-on times).

Figure 6:
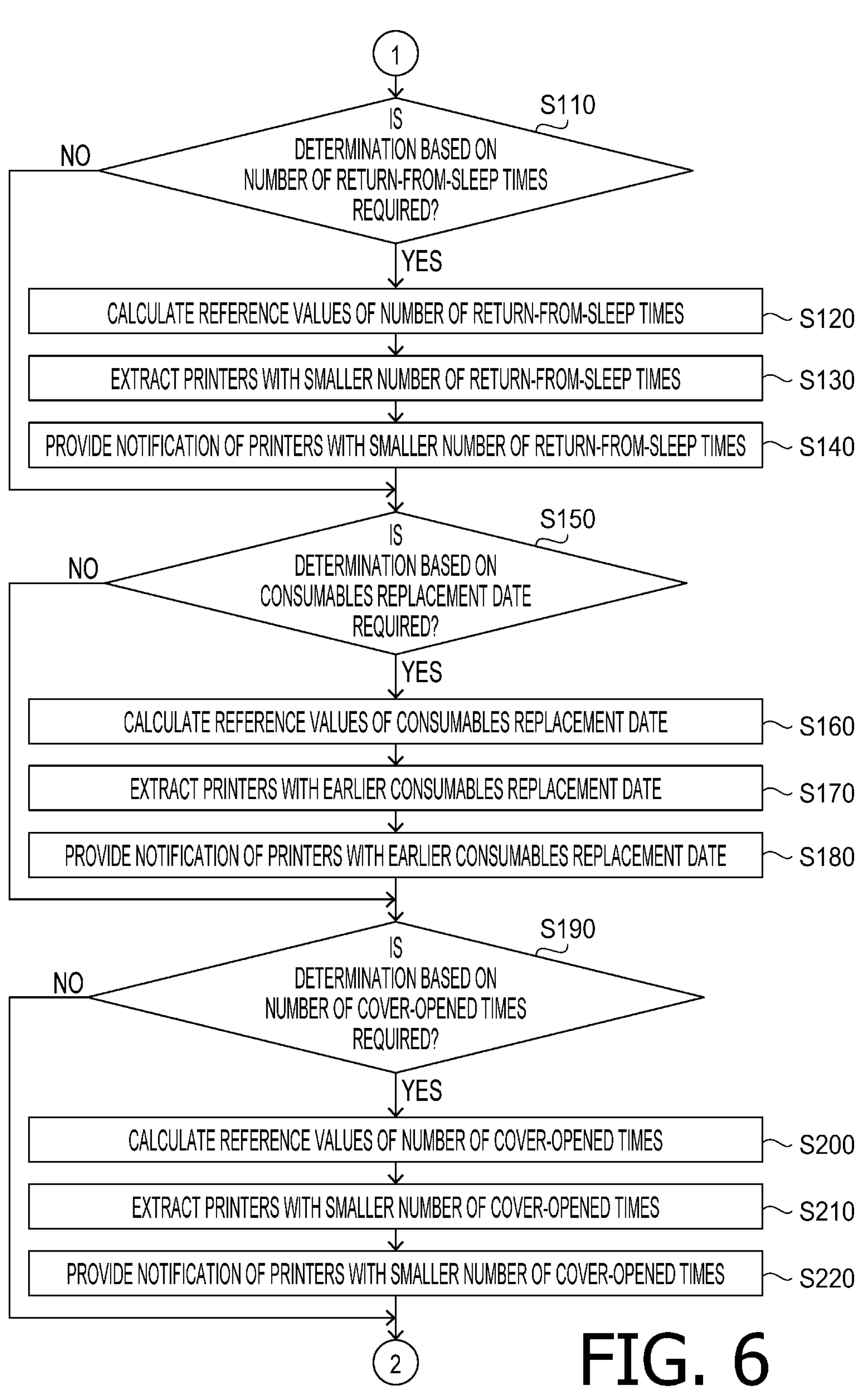

As shown in FIGS. 5 and 6, after S100 or the negative determination in S70 (S70: No), the CPU 21 proceeds to S110 to determine whether a determination based on the number of return-from-sleep times is required to be made. Specifically, the CPU 21 determines whether the check box CB3 in the device notification setting window W2 is set to the checked state. Namely, the CPU 21 determines that the determination based on the number of return-from-sleep times is required to be made, when the check box CB3 is set to the checked state.

In response to determining that the determination based on the number of return-from-sleep times is not required to be made (S110: No), the CPU 21 proceeds to S150. Meanwhile, in response to determining that the determination based on the number of return-from-sleep times is required to be made (S110: Yes), the CPU 21 calculates reference values of the number of return-from-sleep times in S120. Specifically, the CPU 21 first obtains the return-from-sleep-times information from each of the plurality of printers 4 included in the management system 1. Subsequently, based on the obtained return-from-sleep-times information, the CPU 21 calculates, for each of the departments, an average value μ31 and a standard deviation 631 of the return-from-sleep times for the printers 4 belonging to the inkjet printer group P1, and an average value μ32 and a standard deviation 632 of the return-from-sleep times for the printers 4 belonging to the laser printer group P2. Then, the CPU 21 calculates a reference value J31 of the number of return-from-sleep times for the printers 4 belonging to the inkjet printer group P1 using the following formula (5). In addition, the CPU 21 calculates a reference value J32 of the number of return-from-sleep times for the printers 4 belonging to the laser printer group P2 using the following formula (6).

$$J31 = (\mu 31 - 2 \times \sigma 31) \quad (5)$$

$$J32 = (\mu 32 - 2 \times \sigma 32) \quad (6)$$

In S130, for each of the departments, the CPU21 extracts one or more printers 4 each of which has the number of return-from-sleep times less than the reference value J31 from the inkjet printer group P1 as printer(s) 4 with a relatively smaller number of return-from-sleep times, and also extracts one or more printers 4 each of which has the number of return-from-sleep times less than the reference value J32 from the laser printer group P2 as printer(s) 4 with a relatively smaller number of return-from-sleep times.

In S140, the CPU 21 provides a notification of the printers 4 extracted in S130 as printers 4 with a relatively smaller number of return-from-sleep times. Thereafter, the CPU 21 proceeds to S150. Specifically, in S140, the CPU 21 displays, on the display screen of the display 13, the device-specific information for identifying the printers 4 extracted in S130, and a reason for the notification (i.e., a reason why the notification is provided is that each of the printers 4 extracted has a relatively smaller number of return-from-sleep times).

As shown in FIG. 6, after S140 or the negative determination in S110 (S110: No), the CPU 21 proceeds to S150 to determine whether a determination based on the consumables replacement date is required to be made. Specifically, CPU 21 determines whether the check box CB4 in the device notification setting window W2 is set to the checked state. Namely, the CPU 21 determines that the determination based on the consumables replacement date is required to be made, when the check box CB4 is set to the checked state.

In response to determining that the determination based on the consumables replacement date is not required to be made (S150: No), the CPU 21 proceeds to S190. Meanwhile, in response to determining that the determination based on the consumables replacement date is required to be made (S150: Yes), the CPU 21 calculates reference values of the consumables replacement date in S160. Specifically, the CPU 21 first obtains the consumables replacement date information from each of the plurality of printers 4 included in the management system 1. Subsequently, based on the obtained consumables replacement date information, the CPU 21 calculates, for each of the departments, an average value μ41 and a standard deviation 641 of the number of days elapsed from the most recent consumables replacement date until today for the printers 4 belonging to the inkjet printer group P1, and an average value μ42 and a standard deviation σ42 of the number of days elapsed from the most recent consumables replacement date until today for the printers 4 belonging to the laser printer group P2. Then, the CPU 21 sets a day resulting from subtracting a sum (i.e., μ41+σ41) of the average value μ41 and standard deviation 641 from today as a reference value J41 of the consumables replacement date for the printers 4 belonging to the inkjet printer group P1. In addition, the CPU 21 sets a day resulting from subtracting a sum (i.e., μ42+σ42) of the average value μ42 and standard deviation σ42 from today as a reference value J42 of the consumables replacement date for the printers 4 belonging to the laser printer group P2.

In S170, for each of the departments, the CPU 21 extracts one or more printers 4 each of which has a consumables replacement date earlier than the reference value J41 from the inkjet printer group P1 as printer(s) 4 with a relatively earlier consumables replacement date, and also extracts one or more printers 4 each of which has a consumables replacement date earlier than the reference value J42 from the laser printer group P2 as printer(s) 4 with a relatively earlier consumables replacement date.

In S180, the CPU 21 provides a notification of the printer 4 extracted in S170 as printers 4 with a relatively earlier consumables replacement date. Thereafter, the CPU 21 proceeds to S190. Specifically, in S180, the CPU 21 displays, on the display screen of the display 13, the device-specific information for identifying the printers 4 extracted in S170, and a reason for the notification (i.e., a reason why the notification is provided is that each of the printers 4 extracted has a relatively earlier consumable replacement date).

As shown in FIG. 6, after S180 or the negative determination in S150 (S150: No), the CPU 21 proceeds to S190 to determine whether a determination based on the number of cover-opened times is required to be made. Specifically, the CPU 21 determines whether the check box CB5 in the device notification setting window W2 is set to the checked state. Namely, the CPU 21 determines that the determination based on the number of cover-opened times is required to be made, when the check box CB5 is set to the checked state.

In response to determining that the determination based on the number of cover-opened times is not required to be made (S190: No), the CPU 21 proceeds to S230. Meanwhile, in response to determining that the determination based on the number of cover-opened times is required to be made (S190: Yes), the CPU 21 calculates reference values of the number of cover-opened times in S200. Specifically, the CPU 21 first obtains the cover-opened-times information from each of the plurality of printers 4 included in the management system 1. Subsequently, based on the obtained cover-open-times information, the CPU 21 calculates, for each of the departments, an average value μ51 and a standard deviation σ51 of the number of cover-opened times for the printers 4 belonging to the inkjet printer group P1, and an average value μ52 and a standard deviation σ51 of the number of cover-opened times for the printers 4 belonging to the laser printer group P2. Then, the CPU 21 calculates a reference value J51 of the number of cover-opened times for the printers 4 belonging to the inkjet printer group P1 using the following formula (7). In addition, the CPU 21 calculates a reference value J52 of the number of cover-opened times for the printers 4 belonging to the laser printer group P2 using the following formula (8).

$$J51=(\mu 51-2\times\sigma 51) \tag{7}$$

$$J52=(\mu 52-2\times\sigma 52) \tag{8}$$

In S210, for each of the departments, the CPU 21 extracts one or more printers 4 each of which has the number of cover-opened times less than the reference value J51 from the inkjet printer group P1 as printer(s) 4 with a relatively smaller number of cover-opened times, and also extracts one or more printers 4 each of which has the number of cover-opened times less than the reference value J52 from the laser printer group P2 as printer(s) 4 with a relatively smaller number of cover-opened times.

In S220, the CPU 21 provides a notification of the printers 4 extracted in S210 as printers 4 with a relatively smaller number of cover-opened times. Thereafter, the CPU 21 proceeds to S230. Specifically, in S220, the CPU 21 displays, on the display screen of display 13, the device-specific information for identifying the printers 4 extracted in S210 and a reason for notification (i.e., a reason why the notification is provided is that each of the printers 4 extracted has a relatively smaller number of cover-opened times).

Figure 7:
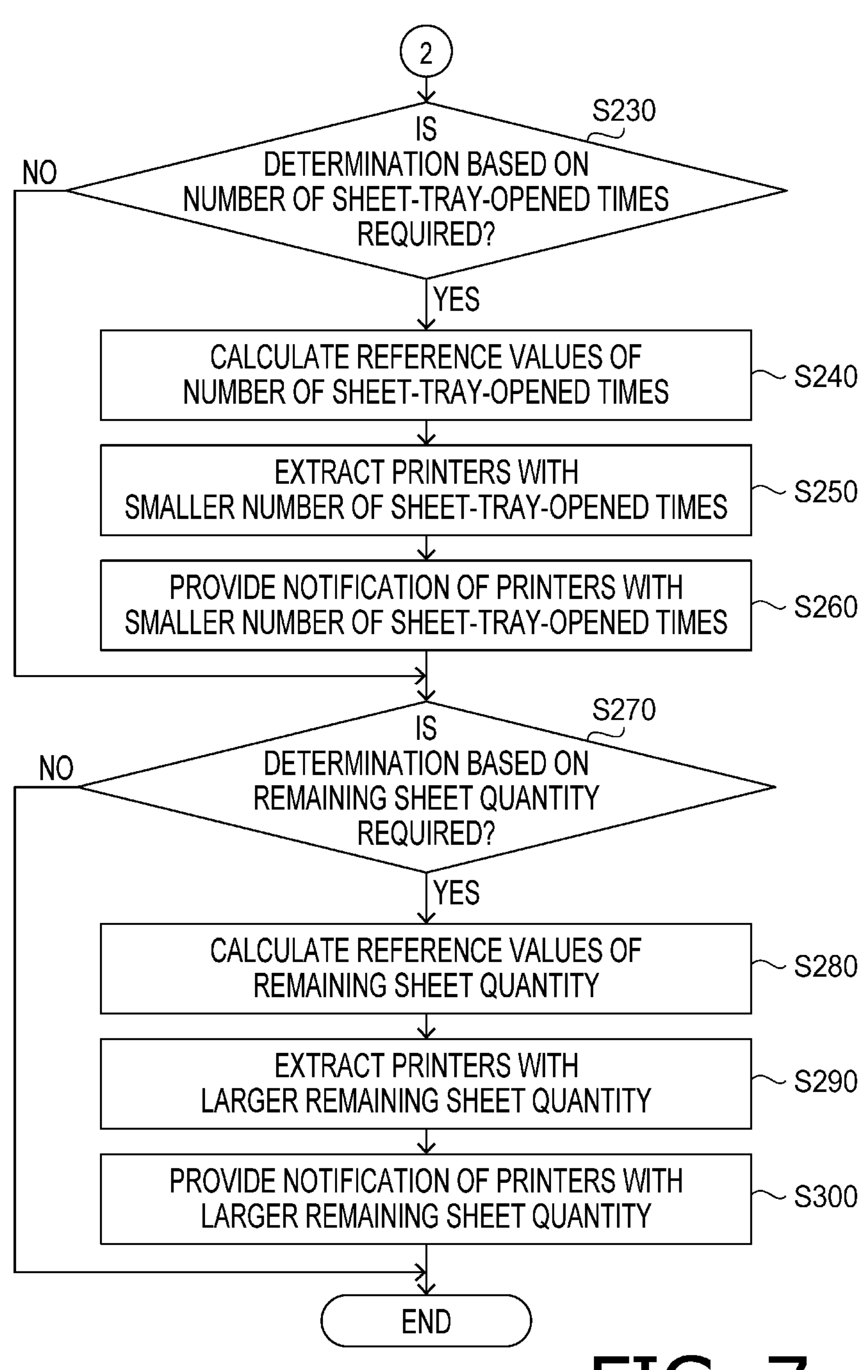

As shown in FIGS. 6 and 7, after S220 or the negative determination in S190 (S190: No), the CPU 21 proceeds to S230 to determine whether a determination based on the number of sheet-tray-opened times is required to be made. Specifically, the CPU 21 determines whether the check box CB6 in the device notification setting window W2 is set to the checked state. Namely, the CPU 21 determines that the determination based on the number of sheet-tray-opened times is required to be made, when the check box CB6 is set to the checked state.

In response to determining that the determination based on the number of sheet-tray-opened times is not required to be made (S230: No), the CPU 21 proceeds to S270. Meanwhile, in response to determining that the determination based on the number of sheet-tray-opened times is required to be made (S230: Yes), the CPU 21 calculates reference values of the number of sheet-tray-opened times in S240. Specifically, the CPU 21 first obtains the sheet-tray-opened-times information from each of the plurality of printers 4 included in the management system 1. Subsequently, based on the obtained sheet-tray-opened-times information, the CPU 21 calculates, for each of the departments, an average value μ61 and a standard deviation σ61 of the number of sheet-tray-opened times for the printers 4 belonging to the inkjet printer group P1, and an average value μ62 and a standard deviation 662 of the number of sheet-tray-opened times for the printers 4 belonging to the laser printer group P2. Then, the CPU 21 calculates a reference value J61 of the number of sheet-tray-opened times for the printers 4 belonging to the inkjet printer group P1 using the following formula (9). In addition, the CPU 21 calculates a reference value J62 of the number of sheet-tray-opened times for the printers 4 belonging to the laser printer group P2 using the following formula (10).

$$J61=(\mu 61-2\times\sigma 61) \tag{9}$$

$$J62=(\mu 62-2\times\sigma 62) \tag{10}$$

In S250, for each of the departments, the CPU 21 extracts one or more printers 4 each of which has the number of sheet-tray-opened times less than the reference value J61 from the inkjet printer group P1 as printer(s) 4 with a relatively smaller number of sheet-tray-opened times, and also extracts one or more printers 4 each of which has the number of sheet-tray-opened times less than the reference value J62 from the laser printer group P2 as printer(s) 4 with a relatively smaller number of sheet-tray-opened times.

In S260, the CPU 21 provides a notification of the printers 4 extracted in S250 as printers 4 with a relatively smaller number of sheet-tray-opened times. Thereafter, the CPU 21 proceeds to S270. Specifically, in S260, the CPU 21 displays, on the display screen of the display 13, the device-specific information for identifying the printers 4 extracted in S250 and a reason for the notification (i.e., a reason why the notification is provided is that each of the printers 4 extracted has a relatively smaller number of sheet-tray-opened times).

As shown in FIG. 7, after S260 or the negative determination in S230 (S230: No), the CPU 21 proceeds to S270 to determine whether a determination based on the remaining sheet quantity is required to be made. Specifically, the CPU 21 determines whether the check box CB7 in the device notification setting window W2 is set to the checked state. Namely, the CPU 21 determines that the determination based on the remaining sheet quantity is required to be made, when the check box CB7 is set to the checked state.

In response to determining that the determination based on the remaining sheet quantity is not required to be made (S270: No), the CPU 21 terminates the printer management process. Meanwhile, in response to determining that the determination based on the remaining sheet quantity is required to be made (S270: Yes), the CPU 21 calculates reference values of the remaining sheet quantity in S280. Specifically, the CPU 21 first obtains the remaining sheet quantity information from each of the plurality of printers 4 included in the management system 1. Subsequently, based on the obtained remaining sheet quantity information, the CPU 21 calculates, for each of the departments, an average value μ71 and a standard deviation 671 of the remaining sheet quantity for the printers 4 belonging to the inkjet printer group P1, and an average value μ72 and a standard deviation σ72 of the remaining sheet quantity for the printers 4 belonging to the laser printer group P2. Then, the CPU 21 calculates a reference value J71 of the remaining sheet quantity for the printers 4 belonging to the inkjet printer group P1 using the following formula (11). In addition, the CPU 21 calculates a reference value J72 of the remaining sheet quantity for the printers 4 belonging to the laser printer group P2 using the following formula (12).

$$J71 = (\mu 71 + 2 \times \sigma 71) \tag{11}$$

$$J72 = (\mu 72 + 2 \times \sigma 72) \tag{12}$$

In S290, for each of the departments, the CPU 21 extracts one or more printers 4 each of which has a remaining sheet quantity greater than the reference value J71 from the inkjet printer group P1 as printer(s) 4 with a relatively larger remaining sheet quantity, and also extracts one or more printers 4 each of which has a remaining sheet quantity greater than the reference value J72 from the laser printer group P2 as printer(s) 4 with a relatively larger remaining sheet quantity.

In S300, the CPU 21 provides a notification of the printers 4 extracted in S290 as printers 4 with a relatively larger remaining sheet quantity. Thereafter, the CPU 21 terminates the printer management process. Specifically, in S300, the CPU 21 displays, on the display screen of the display 13, the device-specific information for identifying the printers 4 extracted in S290 and a reason for the notification (i.e., a reason why the notification is provided is that each of the printers 4 extracted has a relatively larger remaining sheet quantity).

1-5. Advantageous Effects

The management program 23 described above is configured to cause the controller 11 included in the management device 2 that manages the plurality of printers 4 to perform a classification process, a reference value calculation process, a device extraction process, and a notification process.

The classification process is a process to classify each of the plurality of printers 4 into one of the plurality of groups. The reference value calculation process is a process to obtain, from each of the plurality of printers 4, usage frequency information regarding a usage frequency of a corresponding printer 4, and calculate, for each of the plurality of groups, a reference value of the usage frequencies of the printers 4 belonging to a corresponding group.

The device extraction process is a process to extract, for each of the plurality of groups, one or more printers 4 with a relatively lower usage frequency as abnormally used device(s) based on the reference value. The notification process is a process to provide a notification of device-specific information for identifying the abnormally used device(s) extracted in the device extraction process.

In the first illustrative embodiment, the usage frequency information includes, but is not limited to, the usage time information, the power-on-times information, the return-from-sleep-times information, the consumables replacement date information, the cover-opened-times information, the sheet-tray-opened-times information, and the remaining-sheet-quantity information.

The management program 23 configured as above is enabled to extract one or more printers 4 with a relatively lower usage frequency as abnormally used device(s). Thereby, the management program 23 may cause the administrator to take appropriate measures to increase the usage frequencies of the abnormally used device(s). Thus, the management program 23 is enabled to reduce deviation, among the printers 4, of processing loads placed thereon.

Second Illustrative Embodiment

The second illustrative embodiment according to aspects of the present disclosure will be described below with reference to the relevant drawings. In the second illustrative embodiment, differences thereof from the first illustrative embodiment are described. Common elements and configurations between the first and second illustrative embodiments are provided with the same reference numerals.

2-1. Configuration of Management System

Figure 9:
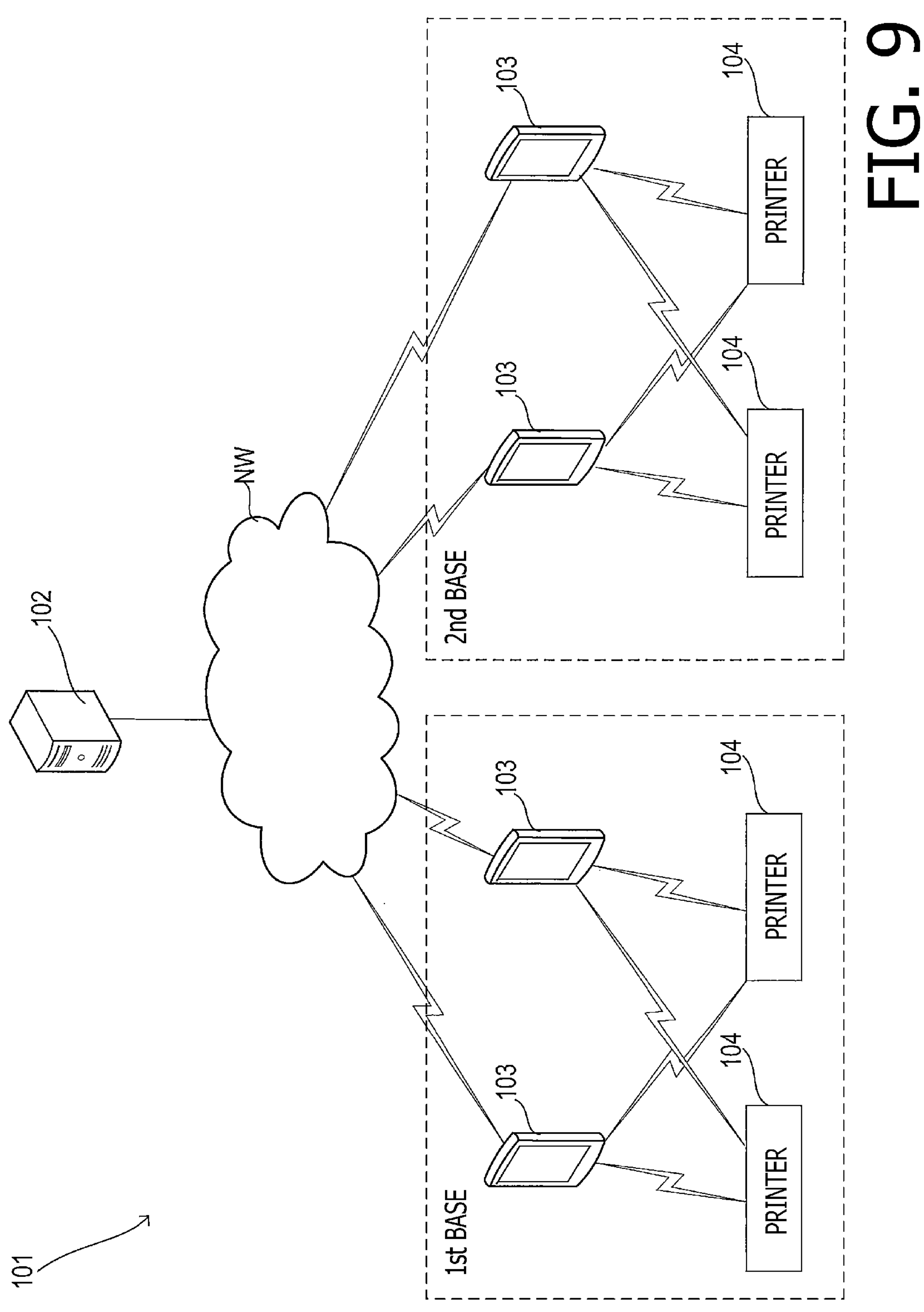
FIG. 9 schematically shows a configuration of a management system.

A management system 101 of the second illustrative embodiment is a system to manage a plurality of printers 104 located at a plurality of bases. As shown in FIG. 9, the management system 101 includes a management device 102, a plurality of mobile terminals 103, and the plurality of printers 104. In the second illustrative embodiment, each of the mobile terminals 103 is located at a first base or a second base, and each of the printers 104 is located at the first base or the second base.

The management device 102 and the mobile terminals 103 are configured to communicate with each other via a wide area network NW. A plurality of mobile terminals 103 located at the first base and a plurality of printers 104 located at the first base are configured to communicate with each other via short-range wireless communication using a method compliant with Bluetooth ("Bluetooth" is a registered trademark of Bluetooth SIG, Inc.) standards or via wired communication using USB ("USB" is an abbreviation for "Universal Serial Bus").

Likewise, a plurality of mobile terminals 103 located at the second base and a plurality of printers 104 located at the second base are configured to communicate with each other via short-range wireless communication using a method compliant with the Bluetooth standards or via wired communication using USB.

In the management system 101 of the second illustrative embodiment, for instance, the management device 102 is enabled to collect information from the plurality of printers 104, and is also enabled to change settings for each of the plurality of printers 104.

Figure 10:
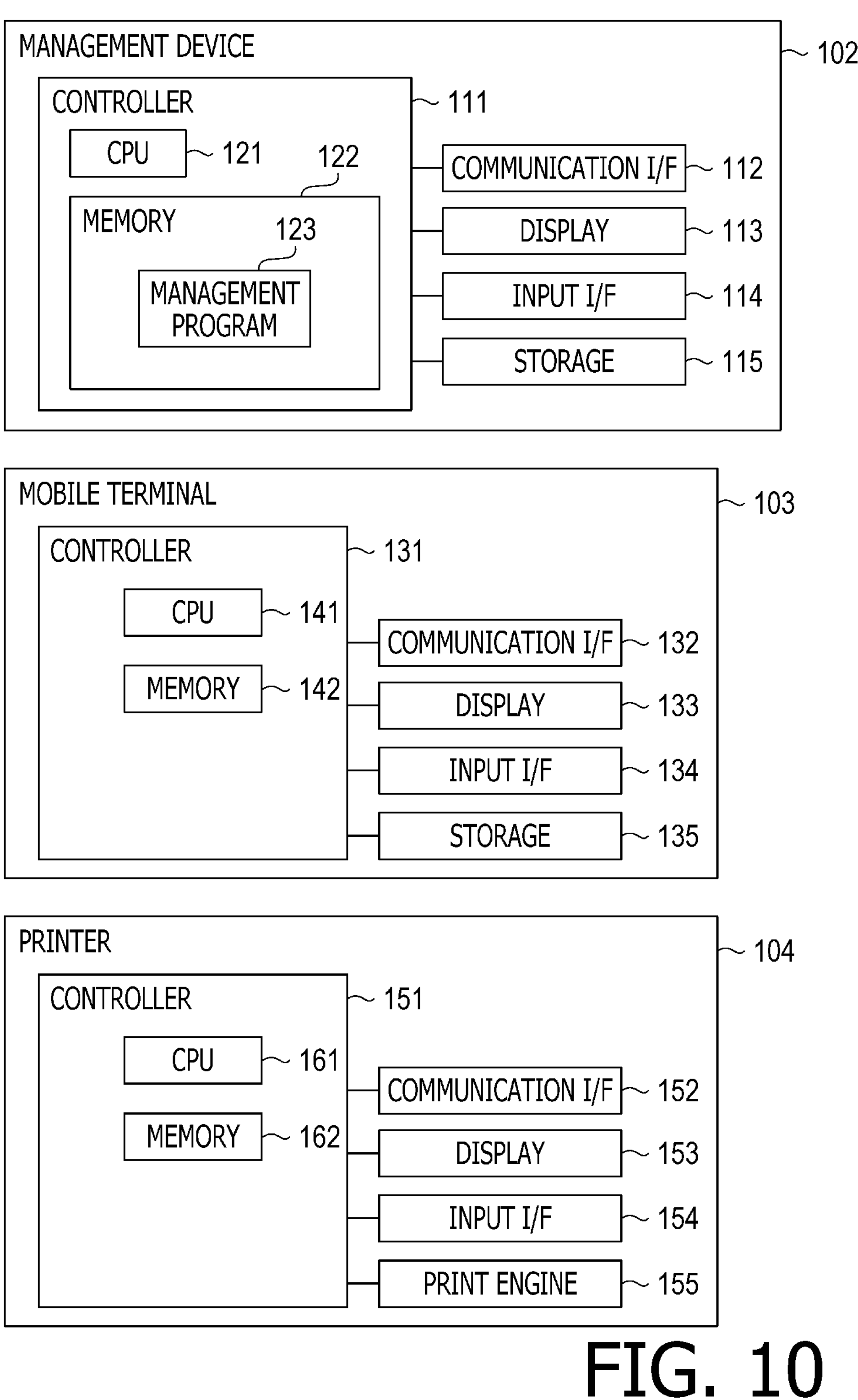
FIG. 10 is a block diagram schematically showing configurations of a management device, a mobile terminal, and a printer.

In the second illustrative embodiment, the management device 102 is a personal computer. As shown in FIG. 10, the management device 102 includes a controller 111, a communication I/F 112, a display 113, an input I/F 114, and a storage 115.

The controller 111 includes a CPU 121 and a memory 122. The CPU 121 is configured to execute programs stored in the memory 122, thereby achieving various functions of the management device 102. The various functions realized by the controller 111 may not necessarily be achieved by the CPU 121 executing the programs, but at least one of the functions may be achieved using one or more hardware elements.

The memory 122 includes semiconductor memories (e.g., a ROM, a RAM and a flash memory). The memory 122 is configured to store a management program 123 and data. The communication I/F 112 is configured to perform data communication with the mobile terminals 103 via the wide-area network NW.

The display 113 is configured to display various images thereon. The input I/F 114 includes a keyboard and a mouse. The input I/F 114 is configured to output input operation information for identifying input operations performed by a user (e.g., an administrator) of the management device 102, for instance, via the keyboard and/or the mouse.

The storage 115 includes auxiliary storage devices such as an HDD and an SSD. The storage 115 is configured to store various types of data. A mobile terminal 103 is assigned to and carried by each operator who performs operations using the printers 104. Each mobile terminal 103 includes a controller 131, a communication I/F 132, a display 133, an input I/F 134, and a storage 135.

The controller 131 includes a CPU 141 and a memory 142. The CPU 141 is configured to execute programs stored in the memory 142, thereby achieving various functions of the mobile terminal 103. The various functions realized by the controller 131 may not necessarily be achieved by the CPU 41 executing the programs, but at least one of the functions may be achieved using one or more hardware elements.

The memory 142 includes semiconductor memories (e.g., a ROM, a RAM and a flash memory). The memory 142 is configured to store programs and data. The communication I/F 132 is configured to perform data communication with the management device 102 via the wide-area network NW. The communication unit 132 is further configured to perform data communication with the printers 104 via short-range wireless communication using a method compliant with the Bluetooth standards or wired communication using USB.

The display 133 is configured to display various images thereon. The input I/F 134 includes a touch panel (not shown) laid on a display screen of the display 133 and switches (not shown) disposed around the display screen of the display 133. The input I/F 134 is configured to output input operation information for identifying input operations performed by a corresponding operator, for instance, via the touch panel and/or the switches.

Each printer 104 is a small and lightweight mobile printer that is carriable by the operators. Each printer 104 includes a controller 151, a communication I/F 152, a display 153, an input I/F 154, and a print engine 155.

The controller 151 includes a CPU 161 and a memory 162. The CPU 161 is configured to execute programs stored in the memory 162, thereby achieving various functions of the printer 104.

The communication I/F 152 is configured to perform data communication with the mobile terminals 103 via short-range wireless communication using a method compliant with the Bluetooth standards or via wired communication using USB. The display 153 is configured to display various images thereon. The input I/F 154 includes switches disposed around a display screen of the display 153. The input I/F 154 is configured to output input operation information for identifying input operations performed by the operators, for instance, via the switches.

The print engine 155 has a thermal printing mechanism. The print engine 155 is configured to print images on a thermal roll sheet. The print engine 155 includes a cutter configured to cut the thermal roll sheet that has an image printed thereon and has been discharged from a discharge port. The print engine 155 may be configured to perform printing using a known printing method (e.g., inkjet method) other than the thermal method.

The controller 151 measures a time (hereinafter referred to as a "usage time") for which the corresponding printer 104 has been used from a predetermined determination period (e.g., one week) ago until the present time, and stores usage time information indicating the measured usage time in the memory 162.

The controller 151 measures the number of times (hereinafter referred to as the "number of power-on times") the corresponding printer 104 has been switched from the power-off state to the power-on state during the determination period to date, and stores power-on-times information indicating the measured number of power-on times in the memory 162.

The controller 151 measures the number of times (hereinafter referred to as the "number of return-from-sleep times") the corresponding printer 104 has been brought back to the normal mode from the sleep mode during the determination period to date, and stores return-from-sleep-times information indicating the measured number of return-from-sleep times in the memory 162.

The controller 151 stores in the memory 162 consumables replacement date information indicating a most recent date (hereinafter referred to as a "consumables replacement date") when a consumable item for the corresponding printer 104 was replaced. The controller 151 measures a length (hereinafter referred to as a "print distance") of the thermal roll sheet over which images have been printed by the corresponding printer 104 during the determination period to date, and stores print distance information indicating the measured print distance in the memory 162.

The controller 151 measures the number of times (hereinafter referred to as the "number of sheet cutting times") the thermal roll sheet has been cut by the corresponding printer 104 during the determination period to date, and stores sheet-cutting-times information indicating the measured number of sheet cutting times in the memory 162.

The controller 151 measures the number of times (hereinafter referred to as the "number of battery charging times") a battery of the corresponding printer 104 has been charged during the determination period to date, and stores battery-charging-times information indicating the measured number of battery charging times in the memory 162.

2-2. Device Notification Setting Window

The management device 102 is configured to display a device notification setting window W12 (see FIG. 11) on the display screen of the display 113. After the management program 123 is launched, the device notification setting window W12 is displayed in response to a particular input operation for displaying the device notification setting window W12 being performed via the keyboard or the mouse.

Figure 11:
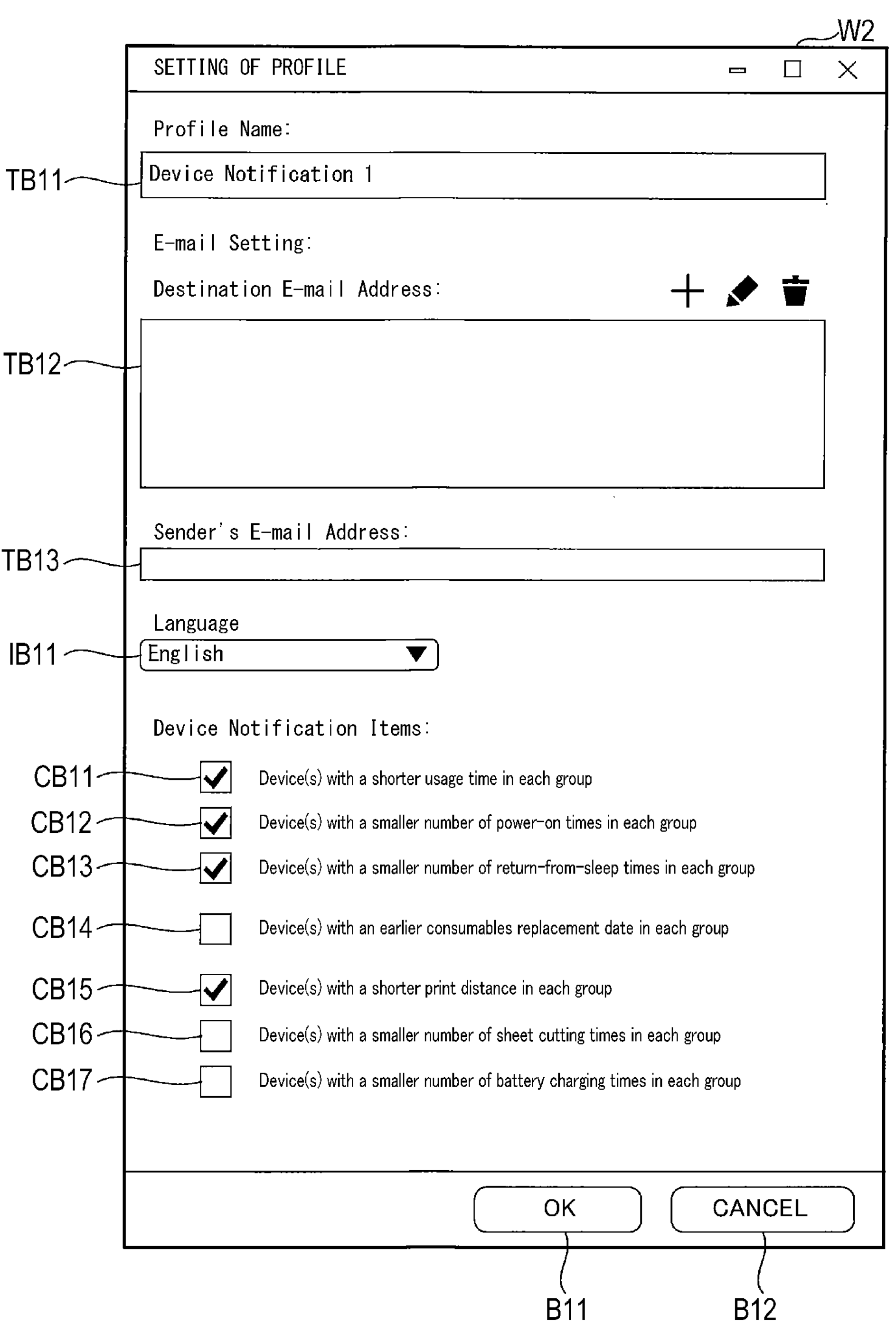
FIG. 11 shows an example of a device notification setting window.

The device notification settings window W12 is a window for setting a profile containing data necessary to provide a device notification. As shown in FIG. 11, the device notification setting window W12 includes input text boxes TB11, TB12, and TB13, a used language input button IB11, check boxes CB11, CB12, CB13, CB14, CB15, CB16, and CB17, an OK button B11, and a cancel button B12.

In the input text box TB11, a character string is entered to identify the profile set in the device notification setting window W12. In the input text box TB12, a character string indicating a destination e-mail address is entered. In the input text box TB13, a character string indicating a sender's e-mail address is entered.

The used language input button IB11 is a pull-down button configured to, when clicked with the mouse, display a plurality of available language choices. The administrator may click one of the displayed available language choices with the mouse, thereby setting a used language.

Each of the checkboxes CB11 to CB17 is configured to, when clicked with the mouse, be switched between a checked state and an unchecked state. The checked state is a state where a check mark is placed in each of the checkboxes CB11 to CB17. The unchecked state is a state where no check mark is placed in each of the checkboxes CB11 to CB17.

The check box CB11 is set to the checked state when the administrator wishes to provide a notification of one or more printers 104 with a relatively shorter usage time (i.e., one or more printers 104 each of which has been used for a relatively shorter period of time) among the printers 104 in each group. The check box CB12 is set to the checked state when the administrator wishes to provide a notification of one or more printers 104 with a relatively smaller number of power-on times (i.e., one or more printers 104 each of which has been switched from the power-off state to the power-on state a relatively smaller number of times) among the printers 104 in each group.

The check box CB13 is set to the checked state when the administrator wishes to provide a notification of one or more printers 104 with a relatively smaller number of return-from-sleep times (i.e., one or more printers 104 each of which has been brought back to the normal mode from the sleep mode a relatively smaller number of times) among the printers 104 in each group. The check box CB14 is set to the checked state when the administrator wishes to provide a notification of one or more printers 104 with a relatively earlier consumables replacement date (i.e., one or more printers 104 of which the most recent date when a consumable item was replaced is relatively earlier) among the printers 104 in each group.

The check box CB15 is set to the checked state when the administrator wishes to provide a notification of one or more printers 104 with a relatively shorter print distance (i.e., one or more printers 104 each of which has a relatively shorter length of the thermal roll sheet over which images have been printed) among the printers 104 in each group. The check box CB16 is set to the checked state when the administrator wishes to provide a notification of one or more printers 104 with a relatively smaller number of sheet cutting times (i.e., one or more printers 104 each of which has cut the thermal roll sheet a relatively smaller number of times) among the printers 104 in each group.

The check box CB17 is set to the checked state when the administrator wishes to provide a notification of one or more printers 104 with a relatively smaller number of battery charging times (i.e., one or more printers 104 in each of which the battery has been charged a relatively smaller number of times) among the printers 104 in each group. The OK button B11 is a button to be operated to complete the setting of the profile with the contents entered in the input text boxes TB11, TB12, and TB13 and the contents set for the used language input button IB11 and the check boxes CB11 to CB17. The cancel button B12 is a button to be operated to interrupt the setting of the profile.

2-3. Process by Management Device

Figure 12:
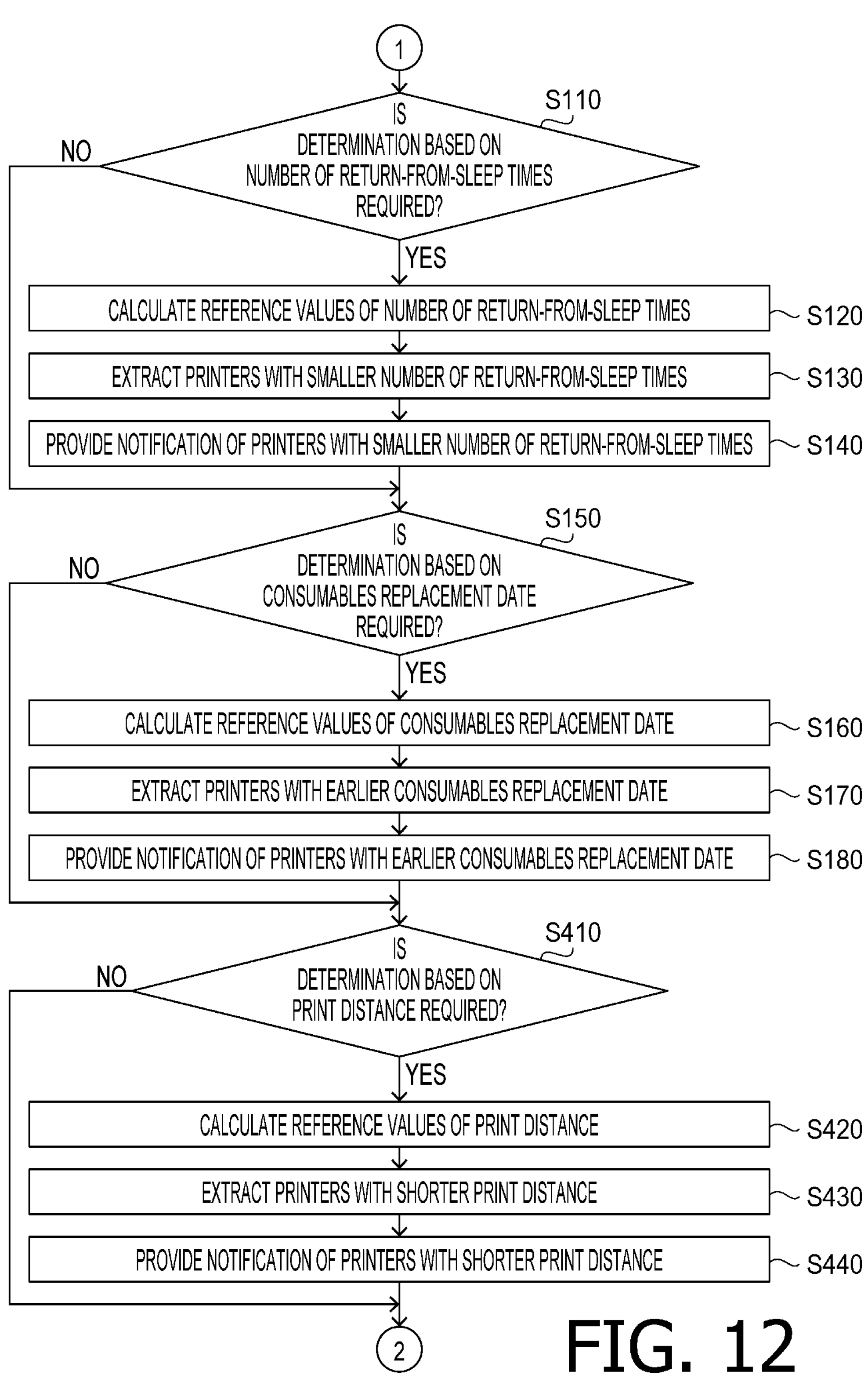
FIGS. 12 and 13 are flowcharts showing a partial procedure of a printer management process.
Figure 13:
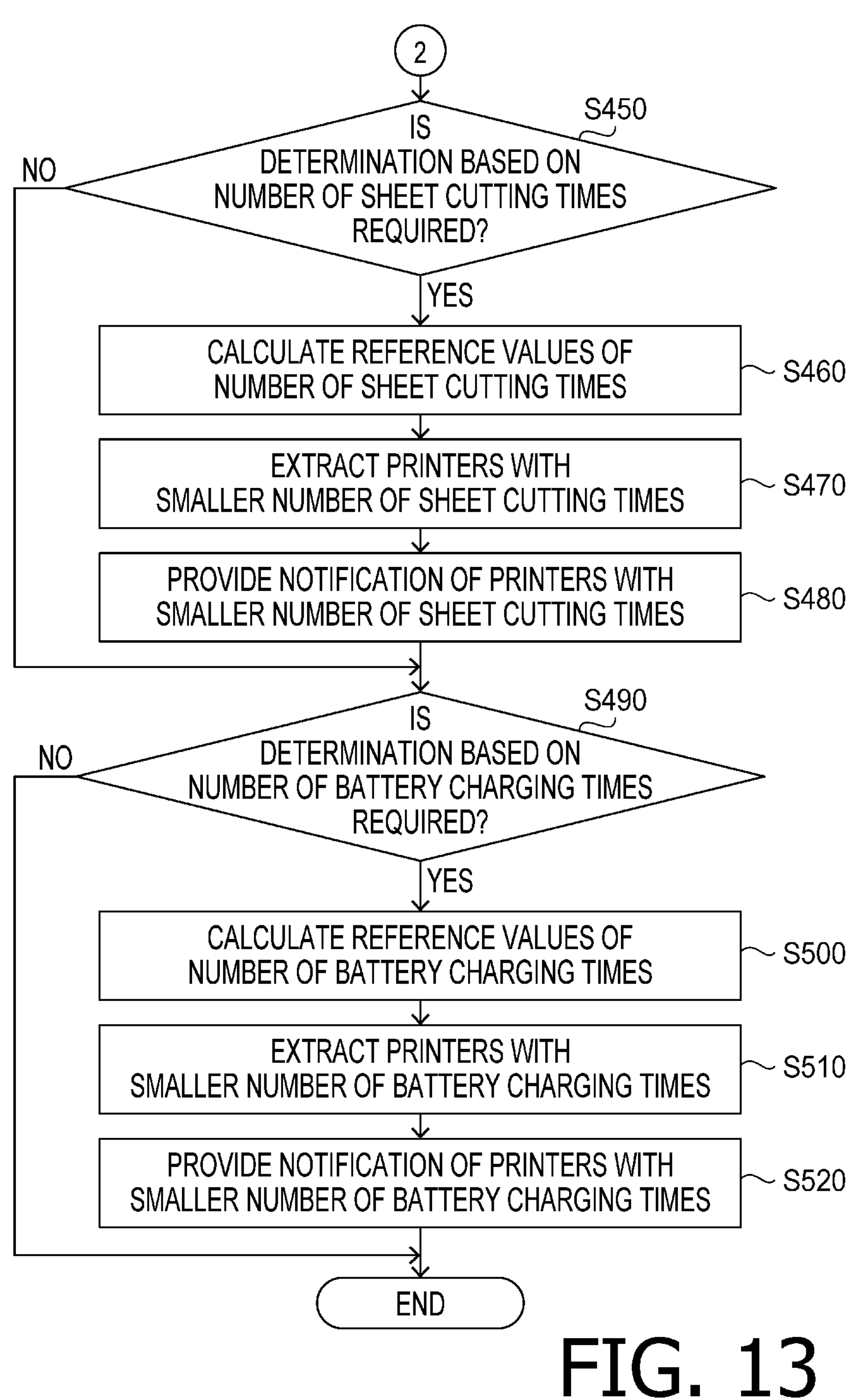

As shown in FIGS. 12 and 13, a printer management process in the second illustrative embodiment differs from the printer management process in the aforementioned first illustrative embodiment in that processes of S190 to S300 are omitted and that processes of S410 to S520 are added.

Namely, as shown in FIG. 12, the CPU 121 proceeds to S410 in response to determining in S150 that the determination based on the consumables replacement date is not required to be made (S150: No). In addition, the CPU 121 proceeds to S410 after completion of S180.

Proceeding to S410, the CPU 121 determines whether a determination based on the print distance is required to be made. Specifically, the CPU 121 determines whether the check box CB15 in the device notification setting window W12 is set to the checked state. Namely, the CPU 121 determines that the determination based on the print distance is required to be made when the check box CB15 is set to the checked state.

In response to determining that the determination based on the print distance is not required to be made (S410: No), the CPU 121 proceeds to S450. Meanwhile, in response to determining that the determination based on the print distance is required to be made (S410: Yes), the CPU 121 calculates reference values of the print distance in S420. Specifically, the CPU 21 first obtains the print distance information from each of the plurality of printers 104 included in the management system 1. Subsequently, based on the obtained print distance information, the CPU 21 calculates an average value μ8 and a standard deviation 68 of the print distance for the printers 104 located at each of the plurality of bases. Then, the CPU 21 calculates a reference value J8 of the print distance for the printers 104 located at each of the plurality of bases using the following formula (13).

$$J8=(\mu 8-2\times\sigma 8) \tag{13}$$

In S430, the CPU 121 extracts one or more printers 104 each of which has a print distance less than the reference value J8 from among the printers 104 located at each of the plurality of bases as printer(s) 104 with a relatively shorter print distance.

In S440, the CPU 121 provides a notification of the printers 104 extracted in S430 as printers 104 with a relatively shorter print distance. Thereafter, the CPU 121 proceeds to S450. Specifically, in S440, the CPU 121 displays, on the display screen of the display 113, the device-specific information for identifying the printers 104 extracted in S430, and a reason for the notification (i.e., a reason why the notification is provided is that each of the printers 104 extracted has a relatively shorter print distance).

As shown in FIGS. 12 and 13, after S440 or the negative determination in S410 (S410: No), the CPU 21 proceeds to S450 to determine whether a determination based on the number of sheet cutting times is required to be made. Specifically, the CPU 121 determines whether the check box CB16 in the device notification setting window W12 is set to the checked state. Namely, the CPU 121 determines that the determination based on the number of sheet cutting times is required to be made, when the check box CB16 is set to the checked state.

In response to determining that the determination based on the number of sheet cutting times is not required to be made (S450: No), the CPU 121 proceeds to S490. Meanwhile, in response to determining that the determination based on the number of sheet cutting times is required to be made (S450: Yes), the CPU 121 calculates reference values of the number of sheet cutting times in S460. Specifically, the CPU 121 first obtains the sheet-cutting-times information from each of the plurality of printers 104 included in the management system 1. Subsequently, based on the obtained sheet-cutting-times information, the CPU 121 calculates an average value μ9 and a standard deviation 69 of the number of sheet cutting times for the printers 104 located at each of the plurality of bases. Then, the CPU 21 calculates a reference value J9 of the number of sheet cutting times for the printers 104 located at each of the plurality of bases using the following formula (14).

$$J9=(\mu 9-2\times\sigma 9) \tag{14}$$

In S470, the CPU 121 extracts one or more printers 104 each of which has the number of sheet cutting times less than the reference value J9 from among the printers 104 located at each of the plurality of bases as printer(s) 104 with a relatively smaller number of sheet cutting times.

In S480, the CPU 121 provides a notification of the printers 104 extracted in S470 as printers 104 with a relatively smaller number of sheet cutting times. Thereafter, the CPU 121 proceeds to S490. Specifically, in S480, the CPU 121 displays, on the display screen of the display 113, device-specific information for identifying the printers 104 extracted in S470 and a reason for the notification (i.e., a reason why the notification is provided is that each of the printers 104 extracted has a relatively smaller number of sheet cutting times).

As shown in FIG. 13, after S480 or the negative determination in S450 (S450: No), the CPU 21 proceeds to S490 to determine whether the determination based on the number of battery charging times is required to be made. Specifically, the CPU 121 determines whether the check box CB17 in the device notification setting window W12 is set to the checked state. Namely, the CPU 121 determines that the determination based on the number of battery charging times is required to be made when the check box CB17 is set to the checked state.

In response to determining that the determination based on the number of battery charging times is not required to be made (S490: No), the CPU 121 terminates the printer management process. Meanwhile, in response to determining that the determination based on the number of battery charging times is required to be made (S490: Yes), the CPU 121 calculates reference values of the number of battery charging times in S500. Specifically, the CPU 121 first obtains the battery-charging-times information from each of the plurality of printers 104 included in the management system 1. Subsequently, based on the obtained battery-charging-times information, the CPU 121 calculates an average value μ10 and a standard deviation σ10 of the number of battery charging times for the printers 104 located at each of the plurality of bases. Then, the CPU 121 calculates a reference value J10 of the number of battery charging times for the printers 104 located at each of the plurality of bases using the following formula (15).

$$J10=(\mu 10-2\times\sigma 10) \tag{15}$$

In S510, the CPU 121 extracts one or more printers 104 which have the number of battery charging times less than the reference value J10 from among the printers 104 located at each of the plurality of bases as printer(s) 104 with a relatively smaller number of battery charging times.

In S520, the CPU 121 provides a notification of the printers 104 extracted in S510 as printers 104 with a relatively smaller number of battery charging times. Thereafter, the CPU 121 terminates the printer management process. Specifically, in S520, the CPU 121 displays, on the display screen of the display 113, device-specific information for identifying the printers 104 extracted in S510 and a reason for the notification (i.e., a reason why the notification is provided is that each of the printers 4 extracted has a relatively smaller number of battery charging times).

2-4. Advantageous Effects

The management program 123 is configured to cause the controller 111 included in the management device 102 that manages the plurality of printers 104 to perform a classification process, a reference value calculation process, a device extraction process, and a notification process.

The classification process is a process to classify each of the plurality of printers 104 into one of a plurality of groups. The reference value calculation process is a process to obtain, from each of the plurality of printers 104, usage frequency information regarding a usage frequency of a corresponding printer 104, and calculate, for each of the plurality of groups, a reference value of the usage frequencies of the printers 104 belonging to a corresponding group.

The device extraction process is a process to extract, for each of the plurality of groups, one or more printers 104 with a relatively lower usage frequency as abnormally used device(s) based on the reference value. The notification process is a process to provide a notification of device-specific information for identifying the abnormally used device(s) extracted in the device extraction process.

In the second illustrative embodiment, the usage frequency information includes, but is not limited to, the usage time information, the power-on-times information, the return-from-sleep-times information, the consumables replacement date information, the print distance information, the sheet-cutting-times information, and the battery-charging-times information.

The management program 123 configured as above is enabled to extract one or more printers 104 with a relatively lower usage frequency as abnormally used device(s). Thereby, the management program 123 may cause the administrator to take appropriate measures for increasing the usage frequencies of the abnormally used device(s). Thus, the management program 123 is enabled to reduce deviation, among the printers 104, of processing loads placed thereon.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents. Some specific examples of potential alternatives, modifications, or variations according to aspects of the present disclosure are provided below.

The aforementioned first illustrative embodiment has shown an example case in which the attributes of the users are the departments. However, the attributes of the users are not limited to the departments to which the users of the printers 4 belong. For instance, the users of the printers 4 may be classified based on which floor of a building the users work on.

The aforementioned illustrative embodiments have shown example cases in which the devices according to aspects of the present disclosure are the printers 4, 104. However, practicable examples of the devices according to aspects of the present disclosure may include, but are not limited to, multi-function peripherals, copy machines, and fax machines that have a scanning function to read images from documents.

The aforementioned first illustrative embodiment has shown an example case in which each of the printers 4 belonging to each of the plurality of departments, i.e., the sales department D1, the development department D2, and the operations department D3 is classified into one of the inkjet printer group P1 and the laser printer group P2. However, if all the printers 4 are either inkjet printers or laser printers, the classification process in S20 may not be performed. In this case, each of the sales department D1, the development department D2, and the operations department D3 may be a group. In addition, if no department is set in a company using the management system 1, the classification process in S10 may not be performed. In this case, each of one inkjet printer group P1 and one laser printer group P2 may be a group.

The aforementioned illustrative embodiments have shown example cases in which a reference value is calculated using an average value and a standard deviation. However, practicable examples are not limited thereto. For instance, a reference value may be calculated using a predetermined deviation rate. In this case, for instance, the reference value J11 of the usage time may be calculated using the following formula (16). A deviation rate x11 in the formula (16) is a number that is equal to or more than 0 and less than 1.

$$J11 = (1 - x11) \times \mu 11 \tag{16}$$

A plurality of functions achieved by a single element in the aforementioned illustrative embodiments may be realized by a plurality of elements. In addition, a single function achieved by a single element in the aforementioned illustrative embodiments may be realized by a plurality of elements. Further, a plurality of functions achieved by a plurality of elements in the aforementioned illustrative embodiments may be realized by a single element. Moreover, a single function achieved by a plurality of elements in the aforementioned illustrative embodiments may be realized by a single element. Further, some (e.g., at least one but not all) of the elements included in the management system 1 or 101 may be omitted. Furthermore, at least some (e.g., at least one) of the elements illustrated in one of the aforementioned illustrative embodiments and modifications may be added or replaced in another one of the aforementioned illustrative embodiments and modifications.

Aspects of the present disclosure may be achieved in various forms, such as the management devices 2, 102, the management system 1 including the management device 2, the management system 101 including the management device 102, a non-transitory computer-readable storage medium (e.g., semiconductor memories) storing computer-readable instructions configured to, when executed by a processor, cause the processor to serve as the management device 2 or 102, and a method for managing a plurality of devices.

The following shows examples of associations between elements illustrated in the aforementioned illustrative embodiment(s) and modification(s), and elements claimed according to aspects of the present disclosure. For instance, the management system 1 and the management system 101 may be included in examples of a "management system" according to aspects of the present disclosure. The plurality of terminal devices 3 and the plurality of mobile terminals 103 may be included in examples of "a plurality of devices" according to aspects of the present disclosure. The management device 2 and the management device 102 may be included in examples of a "management device" according to aspects of the present disclosure. The communication I/F 12 and the communication I/F 112 may be included in examples of a "communication interface" according to aspects of the present disclosure. The controller 11 and the controller 111 may be included in examples of a "controller" according to aspects of the present disclosure. The CPU 21 and the CPU 121 may be included in examples of a "processor" according to aspects of the present disclosure. The memory 22 and the memory 122 may be included in examples of a "non-transitory computer-readable storage medium" according to aspects of the present disclosure. The management program 23 and the management program 123 may be included in examples of "computer-readable instructions" according to aspects of the present disclosure.

What is claimed is:

1. A non-transitory computer-readable storage medium storing computer-readable instructions that are executable by a processor of a management device configured to manage a plurality of devices, the instructions being configured to, when executed by the processor, cause the management device to:

classify each of the plurality of devices into one of a plurality of groups;

obtain usage information from each of the plurality of devices, the usage information including a usage-related value representing how much each of the plurality of devices has been used, the usage information including at least one selected from the group consisting of:

a usage time indicating how long each of the plurality of devices has been used during a particular period to date;

a count of power-on times indicating how many times each of the plurality of devices has been switched from a power-off state to a power-on state during the particular period to date;

a count of return-from-sleep times indicating how many times each of the plurality of devices has been brought back to a normal mode from a sleep mode during the particular period to date;

a count of cover-opened times indicating how many times covers of each of the plurality of devices has been opened during the particular period to date;

a count of battery charging times indicating how many times a battery of each of the plurality of devices has been charged during the particular period to date;

a consumables replacement date indicating a most recent date when a consumable item for each of a plurality of printers was replaced, where the plurality of printers are the plurality of devices;

a count of sheet-tray-opened times indicating how many times a sheet tray of each of the plurality of printers was opened during the particular period to date;

a remaining sheet quantity indicating a quantity of sheets remaining in each of the plurality of printers;

a print distance indicating a length of a sheet over which images have been printed by each of the plurality of printers during the particular period to date; and a count of sheet cutting times indicating how many times a sheet has been cut by each of the plurality of printers during the particular period to date;

calculate a reference value of the usage-related value included in the usage information for one or more devices belonging to each of the plurality of groups;

extract one or more abnormally-used devices each of which has an abnormal usage-related value from the one or more devices belonging to each of the plurality of groups, based on the calculated reference value; and provide a notification of device-specific information for identifying the one or more abnormally-used devices extracted from the one or more devices belonging to each of the plurality of groups.

2. The non-transitory computer-readable storage medium according to claim 1, wherein the instructions are further configured to, when executed by the processor, cause the management device to:

calculate a reference value of the usage time for the one or more devices belonging to each of the plurality of groups; and extract, as the one or more abnormally-used devices, one or more devices each of which has a value of the usage time that is less than the calculated reference value of the usage time from the one or more devices belonging to each of the plurality of groups.

3. The non-transitory computer-readable storage medium according to claim 1, wherein the instructions are further configured to, when executed by the processor, cause the management device to:

calculate a reference value of the count of power-on times for the one or more devices belonging to each of the plurality of groups; and extract, as the one or more abnormally-used devices, one or more devices each of which has a value of the count of power-on times that is less than the calculated reference value of the count of power-on times from the one or more devices belonging to each of the plurality of groups.

4. The non-transitory computer-readable storage medium according to claim 1, wherein the instructions are further configured to, when executed by the processor, cause the management device to:

calculate a reference value of the count of return-from-sleep times for the one or more devices belonging to each of the plurality of groups; and extract, as the one or more abnormally-used devices, one or more devices each of which has a value of the count of return-from-sleep times that is less than the calculated reference value of the count of return-from-sleep times from the one or more devices belonging to each of the plurality of groups.

5. The non-transitory computer-readable storage medium according to claim 1, wherein the instructions are further configured to, when executed by the processor, cause the management device to:

calculate a reference value of the consumables replacement date for one or more printers belonging to each of the plurality of groups; and extract, as the one or more abnormally-used devices, one or more printers each of which has a value of the consumable replacement date that is earlier than the calculated reference value of the consumables replacement date from the one or more printers belonging to each of the plurality of groups.

6. The non-transitory computer-readable storage medium according to claim 1, wherein the instructions are further configured to, when executed by the processor, cause the management device to:

calculate a reference value of the count of cover-opened times for one or more devices belonging to each of the plurality of groups; and p2 extract, as the one or more abnormally-used devices, one or more devices each of which has a value of the count of cover-opened times that is less than the calculated reference value of the count of cover-opened times from the one or more devices belonging to each of the plurality of groups.

7. The non-transitory computer-readable storage medium according to claim 1, wherein the instructions are further configured to, when executed by the processor, cause the management device to:

calculate a reference value of the count of sheet-tray-opened times for one or more printers belonging to each of the plurality of groups; and extract, as the one or more abnormally-used devices, one or more printers each of which has a value of the count of sheet-tray-opened times that is less than the calculated reference value of the count of sheet-trayopened times from the one or more printers belonging to each of the plurality of groups.

8. The non-transitory computer-readable storage medium according to claim 1, wherein the instructions are further configured to, when executed by the processor, cause the management device to:

calculate a reference value of the remaining sheet quantity for one or more printers belonging to each of the plurality of groups; and p2 extract, as the one or more abnormally-used devices, one or more printers each of which has a value of the remaining sheet quantity that is more than the calculated reference value of the remaining sheet quantity from the one or more printers belonging to each of the plurality of groups.

9. The non-transitory computer-readable storage medium according to claim 1, wherein the instructions are further configured to, when executed by the processor, cause the management device to:

calculate a reference value of the print distance for one or more printers belonging to each of the plurality of groups; and extract, as the one or more abnormally-used devices, one or more printers each of which has a value of the print distance that is less than the calculated reference value of the print distance from the one or more printers belonging to each of the plurality of groups.

10. The non-transitory computer-readable storage medium according to claim 1, wherein the instructions are further configured to, when executed by the processor, cause the management device to:

calculate a reference value of the count of sheet cutting times for one or more printers belonging to each of the plurality of groups; and extract, as the one or more abnormally-used devices, one or more printers each of which has a value of the count of sheet cutting times that is less than the calculated reference value of the count of sheet cutting times from the one or more printers belonging to each of the plurality of groups.

11. The non-transitory computer-readable storage medium according to claim 1, wherein the instructions are further configured to, when executed by the processor, cause the management device to:

calculate a reference value of the count of battery charging times for one or more devices belonging to each of the plurality of groups; and extract, as the one or more abnormally-used devices, one or more devices each of which has a value of the count of battery charging times that is less than the calculated reference value of the count of battery charging times from the one or more devices belonging to each of the plurality of groups.

12. The non-transitory computer-readable storage medium according to claim 1, wherein the devices are classified based on location of respective devices and model type.

13. A management device comprising:

a communication interface configured to communicate with a plurality of devices; and a controller configured to:

classify each of the plurality of devices into one of a plurality of groups;

obtain usage information from each of the plurality of devices via the communication interface, the usage information including a usage-related value representing how much each of the plurality of devices has been used, the usage information including at least one selected from the group consisting of:

a usage time indicating how long each of the plurality of devices has been used during a particular period to date;

a count of power-on times indicating how many times each of the plurality of devices has been switched from a power-off state to a power-on state during the particular period to date;

a count of return-from-sleep times indicating how many times each of the plurality of devices has been brought back to a normal mode from a sleep mode during the particular period to date;

a count of cover-opened times indicating how many times covers of each of the plurality of devices has been opened during the particular period to date;

a count of battery charging times indicating how many times a battery of each of the plurality of devices has been charged during the particular period to date;

a consumables replacement date indicating a most recent date when a consumable item for each of a plurality of printers was replaced, where the plurality of devices are the plurality of printers;

a count of sheet-tray-opened times indicating how many times a sheet tray of each of the plurality of printers was opened during the particular period to date;

a remaining sheet quantity indicating a quantity of sheets remaining in each of the plurality of printers;

a print distance indicating a length of a sheet over which images have been printed by each of the plurality of printers during the particular period to date; and a count of sheet cutting times indicating how many times a sheet has been cut by each of the plurality of printers during the particular period to date;

calculate a reference value of the usage-related value included in the usage information for one or more devices belonging to each of the plurality of groups;

extract one or more abnormally-used devices each of which has an abnormal usage-related value from the one or more devices belonging to each of the plurality of groups, based on the calculated reference value; and provide a notification of device-specific information for identifying the one or more abnormally-used devices extracted from the one or more devices belonging to each of the plurality of groups.

14. The management device according to claim 13, wherein the controller comprises:

a processor; and a non-transitory computer-readable storage medium storing computer-readable instructions configured to, when executed by the processor, cause the controller to:

classify each of the plurality of devices into one of the plurality of groups;

obtain the usage information from each of the plurality of devices via the communication interface;

calculate the reference value of the usage-related value included in the usage information for the one or more devices belonging to each of the plurality of groups;

extract the one or more abnormally-used devices each of which has an abnormal usage-related value from the one or more devices belonging to each of the plurality of groups, based on the calculated reference value; and provide the notification of the device-specific information for identifying the one or more abnormally-used devices extracted from the one or more devices belonging to each of the plurality of groups.

15. A management system comprising:

a plurality of devices; and a management device comprising:

a communication interface configured to communicate with the plurality of devices; and a controller configured to:

classify each of the plurality of devices into one of a plurality of groups;

obtain usage information from each of the plurality of devices via the communication interface, the usage information including a usage-related value representing how much each of the plurality of devices has been used, the usage information including at least one selected from the group consisting of:

a usage time indicating how long each of the plurality of devices has been used during a particular period to date;

a count of power-on times indicating how many times each of the plurality of devices has been switched from a power-off state to a power-on state during the particular period to date;

a count of return-from-sleep times indicating how many times each of the plurality of devices has been brought back to a normal mode from a sleep mode during the particular period to date;

a count of cover-opened times indicating how many times covers of each of the plurality of devices has been opened during the particular period to date;

a count of battery charging times indicating how many times a battery of each of the plurality of devices has been charged during the particular period to date;

a consumables replacement date indicating a most recent date when a consumable item for each of a plurality of printers was replaced, where the plurality of devices are the plurality of printers;

a count of sheet-tray-opened times indicating how many times a sheet tray of each of the plurality of printers was opened during the particular period to date;

a remaining sheet quantity indicating a quantity of sheets remaining in each of the plurality of printers;

a print distance indicating a length of a sheet over which images have been printed by each of the plurality of printers during the particular period to date; and a count of sheet cutting times indicating how many times a sheet has been cut by each of the plurality of printers during the particular period to date;

calculate a reference value of the usage-related value included in the usage information for one or more devices belonging to each of the plurality of groups;

extract one or more abnormally-used devices each of which has an abnormal usage-related value from the one or more devices belonging to each of the plurality of groups, based on the calculated reference value; and provide a notification of device-specific information for identifying the one or more abnormally-used devices extracted from the one or more devices belonging to each of the plurality of groups.

16. A non-transitory computer-readable storage medium storing computer-readable instructions that are executable by a processor of a management device configured to manage a plurality of devices, the instructions being configured to, when executed by the processor, cause the management device to:

classify each of the plurality of devices into one of a plurality of groups;

obtain usage information representing normal operational parameters obtained during regular device operation, and not comprising malfunction or error-occurrence data from each of the plurality of devices, the usage information including a usage-related value representing how each of the plurality of devices has been used;

calculate a reference value of the usage-related value included in the usage information for one or more devices belonging to each of the plurality of groups;

extract one or more devices which are neither malfunctioning nor operating in error, but are deemed to have an abnormal usage with respect to other devices within a same group, based on the calculated reference value, respectively, and the usage-related value included in the usage information for the one or more devices belonging to each of the plurality of groups; and provide a notification of device-specific information for identifying the one or more devices extracted from the one or more devices belonging to each of the plurality of groups.

* * * * *